United States Patent
Kako et al.

(10) Patent No.: US 9,991,563 B2
(45) Date of Patent: Jun. 5, 2018

(54) ENERGY STORAGE DEVICE AND ENERGY STORAGE APPARATUS

(71) Applicant: GS Yuasa International Ltd., Kyoto-shi, Kyoto (JP)

(72) Inventors: Tomonori Kako, Kyoto (JP); Taro Yamafuku, Kyoto (JP); Akihiko Miyazaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days. days.

(21) Appl. No.: 15/165,565

(22) Filed: May 26, 2016

(65) Prior Publication Data

US 2016/0351967 A1 Dec. 1, 2016

(30) Foreign Application Priority Data

May 29, 2015 (JP) .................. 2015-110296

(51) Int. Cl.
*H01M 10/0587* (2010.01)
*H01G 11/24* (2013.01)
(Continued)

(52) U.S. Cl.
CPC ........ *H01M 10/0587* (2013.01); *H01G 11/24* (2013.01); *H01G 11/32* (2013.01);
(Continued)

(58) Field of Classification Search
CPC ......... H01M 10/0587; H01M 10/0525; H01M 4/133; H01M 4/587; H01M 4/62; H01M 4/625; H01M 4/364; H01M 4/622; H01M 2004/027; H01G 11/24; H01G 11/32; H01G 11/38; Y02E 60/13
See application file for complete search history.

(56) References Cited

U.S. PATENT DOCUMENTS

| | | | | |
|---|---|---|---|---|
| 6,300,013 | B1 * | 10/2001 | Yamada | .................. H01M 4/13 429/231.8 |
| 9,040,182 | B2 | 5/2015 | Mitsuda | |
| 2007/0015056 | A1 * | 1/2007 | Takei | ..................... C01B 31/04 429/231.8 |

(Continued)

FOREIGN PATENT DOCUMENTS

| CN | 102231434 A | 11/2011 |
|---|---|---|
| EP | 2615682 A1 | 7/2013 |

(Continued)

OTHER PUBLICATIONS

Extended European Search Report dated Aug. 9, 2016 issued in the corresponding European patent application No. 16171285.6.

*Primary Examiner* — Alex Usyatinsky
(74) *Attorney, Agent, or Firm* — Rankin, Hill & Clark LLP

(57) ABSTRACT

An energy storage device includes a positive electrode and a negative electrode. The negative electrode includes graphite and non-graphitizable carbon, and a D50 particle size of the graphite at which a cumulative volume in a particle size distribution of a particle size reaches 50% is 2 μm or more. A ratio of a mass of the non-graphitizable carbon to a total amount of a mass of the graphite and a mass of the non-graphitizable carbon is 5% by mass or more and 45% by mass or less and a ratio of the D50 particle size of the graphite to a D50 particle size of the non-graphitizable carbon is 1.02 or less.

6 Claims, 16 Drawing Sheets

(51) Int. Cl.
    *H01G 11/32*   (2013.01)
    *H01G 11/38*   (2013.01)
    *H01M 4/133*   (2010.01)
    *H01M 4/36*    (2006.01)
    *H01M 4/587*   (2010.01)
    *H01M 4/62*    (2006.01)
    *H01M 10/0525* (2010.01)
    *H01M 10/647*  (2014.01)
    *H01M 4/02*    (2006.01)

(52) U.S. Cl.
    CPC ............ *H01G 11/38* (2013.01); *H01M 4/133* (2013.01); *H01M 4/364* (2013.01); *H01M 4/587* (2013.01); *H01M 4/622* (2013.01); *H01M 4/625* (2013.01); *H01M 10/0525* (2013.01); *H01M 10/647* (2015.04); *H01M 2004/027* (2013.01); *Y02E 60/13* (2013.01)

(56) References Cited

U.S. PATENT DOCUMENTS

| | | | | |
|---|---|---|---|---|
| 2012/0276421 | A1* | 11/2012 | Aihara | H01M 4/133 429/7 |
| 2013/0183580 | A1* | 7/2013 | Kako | H01M 4/1391 429/206 |
| 2013/0244072 | A1* | 9/2013 | Miyazaki | H01M 10/0409 429/94 |
| 2015/0221944 | A1 | 8/2015 | Uebo et al. | |
| 2015/0364751 | A1 | 12/2015 | Wakizaka | |
| 2016/0126023 | A1* | 5/2016 | Cao | H01G 11/06 361/502 |

FOREIGN PATENT DOCUMENTS

| | | | |
|---|---|---|---|
| JP | 10255766 | A2 | 9/1998 |
| JP | 10270019 | A2 | 10/1998 |
| JP | 11204107 | A2 | 7/1999 |
| JP | 11250909 | A2 | 9/1999 |
| JP | 2003017059 | A2 | 1/2003 |
| JP | 2003142075 | A2 | 5/2003 |
| JP | 2009134916 | A2 | 6/2009 |
| JP | 2013222550 | A2 | 10/2013 |
| WO | 2010041907 | A2 | 4/2010 |
| WO | 2011092990 | A1 | 8/2011 |
| WO | 2014041793 | A1 | 3/2014 |
| WO | 2014092141 | A1 | 6/2014 |
| WO | 2014142285 | A1 | 9/2014 |

* cited by examiner

FIG. 3

| | RATIO OF GRAPHITE [mass%] | RATIO OF NON-GRAPHITIZABLE CARBON [mass%] | GRAPHITE PARTICLE SIZE (DG) [μm] | NON-GRAPHITIZABLE CARBON PARTICLE SIZE [μm] | DG/DN |
|---|---|---|---|---|---|
| COMPARATIVE EXAMPLE 1 | 100 | 0 | 1.5 | - | - |
| COMPARATIVE EXAMPLE 2 | 100 | 0 | 2.1 | - | - |
| COMPARATIVE EXAMPLE 3 | 100 | 0 | 4.5 | - | - |
| COMPARATIVE EXAMPLE 4 | 100 | 0 | 6.3 | - | - |
| COMPARATIVE EXAMPLE 5 | 100 | 0 | 8.3 | - | - |
| COMPARATIVE EXAMPLE 6 | 100 | 0 | 10.1 | - | - |
| COMPARATIVE EXAMPLE 7 | 100 | 0 | 12.2 | - | - |
| COMPARATIVE EXAMPLE 8 | 95 | 5 | 1.5 | 1.5 | 1.00 |
| COMPARATIVE EXAMPLE 9 | 95 | 5 | 1.5 | 2.1 | 0.71 |
| EXAMPLE 1 | 95 | 5 | 2.1 | 2.1 | 1.00 |
| COMPARATIVE EXAMPLE 10 | 95 | 5 | 4.5 | 2.1 | 2.14 |
| COMPARATIVE EXAMPLE 11 | 95 | 5 | 1.5 | 4.5 | 0.33 |
| EXAMPLE 2 | 95 | 5 | 2.1 | 4.5 | 0.47 |
| EXAMPLE 3 | 95 | 5 | 4.5 | 4.5 | 1.00 |
| COMPARATIVE EXAMPLE 12 | 95 | 5 | 6.3 | 4.5 | 1.40 |
| COMPARATIVE EXAMPLE 13 | 95 | 5 | 1.5 | 6.2 | 0.24 |
| EXAMPLE 4 | 95 | 5 | 2.1 | 6.2 | 0.34 |
| EXAMPLE 5 | 95 | 5 | 4.5 | 6.2 | 0.73 |
| EXAMPLE 6 | 95 | 5 | 6.3 | 6.2 | 1.02 |
| COMPARATIVE EXAMPLE 14 | 95 | 5 | 8.3 | 6.2 | 1.34 |
| COMPARATIVE EXAMPLE 15 | 95 | 5 | 1.5 | 8.1 | 0.19 |
| EXAMPLE 7 | 95 | 5 | 2.1 | 8.1 | 0.26 |
| EXAMPLE 8 | 95 | 5 | 4.5 | 8.1 | 0.56 |
| EXAMPLE 9 | 95 | 5 | 6.3 | 8.1 | 0.78 |
| EXAMPLE 10 | 95 | 5 | 8.3 | 8.1 | 1.02 |
| COMPARATIVE EXAMPLE 16 | 95 | 5 | 10.1 | 8.1 | 1.25 |
| COMPARATIVE EXAMPLE 17 | 95 | 5 | 1.5 | 10.4 | 0.14 |
| EXAMPLE 11 | 95 | 5 | 2.1 | 10.4 | 0.20 |
| EXAMPLE 12 | 95 | 5 | 4.5 | 10.4 | 0.43 |
| EXAMPLE 13 | 95 | 5 | 6.3 | 10.4 | 0.61 |
| EXAMPLE 14 | 95 | 5 | 8.3 | 10.4 | 0.80 |
| EXAMPLE 15 | 95 | 5 | 10.1 | 10.4 | 0.97 |
| COMPARATIVE EXAMPLE 18 | 95 | 5 | 12.2 | 10.4 | 1.17 |

FIG. 4

| | RATIO OF GRAPHITE [mass%] | RATIO OF NON-GRAPHITIZABLE CARBON [mass%] | GRAPHITE PARTICLE SIZE (DG) [μm] | NON-GRAPHITIZABLE CARBON PARTICLE SIZE [μm] | DG/DN |
|---|---|---|---|---|---|
| COMPARATIVE EXAMPLE 19 | 90 | 10 | 1.5 | 1.5 | 1.00 |
| COMPARATIVE EXAMPLE 20 | 90 | 10 | 1.5 | 2.1 | 0.71 |
| EXAMPLE 16 | 90 | 10 | 2.1 | 2.1 | 1.00 |
| COMPARATIVE EXAMPLE 21 | 90 | 10 | 4.5 | 2.1 | 2.14 |
| COMPARATIVE EXAMPLE 22 | 90 | 10 | 1.5 | 4.5 | 0.33 |
| EXAMPLE 17 | 90 | 10 | 2.1 | 4.5 | 0.47 |
| EXAMPLE 18 | 90 | 10 | 4.5 | 4.5 | 1.00 |
| COMPARATIVE EXAMPLE 23 | 90 | 10 | 6.3 | 4.5 | 1.40 |
| COMPARATIVE EXAMPLE 24 | 90 | 10 | 1.5 | 6.2 | 0.24 |
| EXAMPLE 19 | 90 | 10 | 2.1 | 6.2 | 0.34 |
| EXAMPLE 20 | 90 | 10 | 4.5 | 6.2 | 0.73 |
| EXAMPLE 21 | 90 | 10 | 6.3 | 6.2 | 1.02 |
| COMPARATIVE EXAMPLE 25 | 90 | 10 | 8.3 | 6.2 | 1.34 |
| COMPARATIVE EXAMPLE 26 | 90 | 10 | 1.5 | 8.1 | 0.19 |
| EXAMPLE 22 | 90 | 10 | 2.1 | 8.1 | 0.26 |
| EXAMPLE 23 | 90 | 10 | 4.5 | 8.1 | 0.56 |
| EXAMPLE 24 | 90 | 10 | 6.3 | 8.1 | 0.78 |
| EXAMPLE 25 | 90 | 10 | 8.3 | 8.1 | 1.02 |
| COMPARATIVE EXAMPLE 27 | 90 | 10 | 10.1 | 8.1 | 1.28 |
| COMPARATIVE EXAMPLE 28 | 90 | 10 | 1.5 | 10.4 | 0.14 |
| EXAMPLE 26 | 90 | 10 | 2.1 | 10.4 | 0.20 |
| EXAMPLE 27 | 90 | 10 | 4.5 | 10.4 | 0.43 |
| EXAMPLE 28 | 90 | 10 | 6.3 | 10.4 | 0.61 |
| EXAMPLE 29 | 90 | 10 | 8.3 | 10.4 | 0.80 |
| EXAMPLE 30 | 90 | 10 | 10.1 | 10.4 | 0.97 |
| COMPARATIVE EXAMPLE 29 | 90 | 10 | 12.2 | 10.4 | 1.17 |

FIG. 5

| | RATIO OF GRAPHITE [mass%] | RATIO OF NON-GRAPHITIZABLE CARBON [mass%] | GRAPHITE PARTICLE SIZE (DG) [μm] | NON-GRAPHITIZABLE CARBON PARTICLE SIZE [μm] | DG/DN |
|---|---|---|---|---|---|
| COMPARATIVE EXAMPLE 30 | 85 | 15 | 1.5 | 1.5 | 1.00 |
| COMPARATIVE EXAMPLE 31 | 85 | 15 | 1.5 | 2.1 | 0.71 |
| EXAMPLE 31 | 85 | 15 | 2.1 | 2.1 | 1.00 |
| COMPARATIVE EXAMPLE 32 | 85 | 15 | 4.5 | 2.1 | 2.14 |
| COMPARATIVE EXAMPLE 33 | 85 | 15 | 1.5 | 4.5 | 0.33 |
| EXAMPLE 32 | 85 | 15 | 2.1 | 4.5 | 0.47 |
| EXAMPLE 33 | 85 | 15 | 4.5 | 4.5 | 1.00 |
| COMPARATIVE EXAMPLE 33 | 85 | 15 | 6.3 | 4.5 | 1.40 |
| COMPARATIVE EXAMPLE 34 | 85 | 15 | 1.5 | 6.2 | 0.24 |
| EXAMPLE 34 | 85 | 15 | 2.1 | 6.2 | 0.34 |
| EXAMPLE 35 | 85 | 15 | 4.5 | 6.2 | 0.73 |
| EXAMPLE 36 | 85 | 15 | 6.3 | 6.2 | 1.02 |
| COMPARATIVE EXAMPLE 35 | 85 | 15 | 8.3 | 6.2 | 1.34 |
| COMPARATIVE EXAMPLE 36 | 85 | 15 | 1.5 | 8.1 | 0.19 |
| EXAMPLE 37 | 85 | 15 | 2.1 | 8.1 | 0.26 |
| EXAMPLE 38 | 85 | 15 | 4.5 | 8.1 | 0.56 |
| EXAMPLE 39 | 85 | 15 | 6.3 | 8.1 | 0.78 |
| EXAMPLE 40 | 85 | 15 | 8.3 | 8.1 | 1.02 |
| COMPARATIVE EXAMPLE 37 | 85 | 15 | 10.1 | 8.1 | 1.28 |
| COMPARATIVE EXAMPLE 38 | 85 | 15 | 1.5 | 10.4 | 0.14 |
| EXAMPLE 41 | 85 | 15 | 2.1 | 10.4 | 0.20 |
| EXAMPLE 42 | 85 | 15 | 4.5 | 10.4 | 0.43 |
| EXAMPLE 43 | 85 | 15 | 6.3 | 10.4 | 0.61 |
| EXAMPLE 44 | 85 | 15 | 8.3 | 10.4 | 0.80 |
| EXAMPLE 45 | 85 | 15 | 10.1 | 10.4 | 0.97 |
| COMPARATIVE EXAMPLE 39 | 85 | 15 | 12.2 | 10.4 | 1.17 |

FIG. 6

| | RATIO OF GRAPHITE [mass%] | RATIO OF NON-GRAPHITIZABLE CARBON [mass%] | GRAPHITE PARTICLE SIZE (DG) [μm] | NON-GRAPHITIZABLE CARBON PARTICLE SIZE [μm] | DG/DN |
|---|---|---|---|---|---|
| COMPARATIVE EXAMPLE 40 | 80 | 20 | 1.5 | 1.5 | 1.00 |
| COMPARATIVE EXAMPLE 41 | 80 | 20 | 1.5 | 2.1 | 0.71 |
| EXAMPLE 46 | 80 | 20 | 2.1 | 2.1 | 1.00 |
| COMPARATIVE EXAMPLE 42 | 80 | 20 | 4.5 | 2.1 | 2.14 |
| COMPARATIVE EXAMPLE 43 | 80 | 20 | 1.5 | 4.5 | 0.33 |
| EXAMPLE 47 | 80 | 20 | 2.1 | 4.5 | 0.47 |
| EXAMPLE 48 | 80 | 20 | 4.5 | 4.5 | 1.00 |
| COMPARATIVE EXAMPLE 44 | 80 | 20 | 6.3 | 4.5 | 1.40 |
| COMPARATIVE EXAMPLE 45 | 80 | 20 | 1.5 | 6.2 | 0.24 |
| EXAMPLE 49 | 80 | 20 | 2.1 | 6.2 | 0.34 |
| EXAMPLE 50 | 80 | 20 | 4.5 | 6.2 | 0.73 |
| EXAMPLE 51 | 80 | 20 | 6.3 | 6.2 | 1.02 |
| COMPARATIVE EXAMPLE 46 | 80 | 20 | 8.3 | 6.2 | 1.34 |
| COMPARATIVE EXAMPLE 47 | 80 | 20 | 1.5 | 8.1 | 0.19 |
| EXAMPLE 52 | 80 | 20 | 2.1 | 8.1 | 0.26 |
| EXAMPLE 53 | 80 | 20 | 4.5 | 8.1 | 0.56 |
| EXAMPLE 54 | 80 | 20 | 6.3 | 8.1 | 0.78 |
| EXAMPLE 55 | 80 | 20 | 8.3 | 8.1 | 1.02 |
| COMPARATIVE EXAMPLE 48 | 80 | 20 | 10.1 | 8.1 | 1.28 |
| COMPARATIVE EXAMPLE 49 | 80 | 20 | 1.5 | 10.4 | 0.14 |
| EXAMPLE 56 | 80 | 20 | 2.1 | 10.4 | 0.20 |
| EXAMPLE 57 | 80 | 20 | 4.5 | 10.4 | 0.43 |
| EXAMPLE 58 | 80 | 20 | 6.3 | 10.4 | 0.61 |
| EXAMPLE 59 | 80 | 20 | 8.3 | 10.4 | 0.80 |
| EXAMPLE 60 | 80 | 20 | 10.1 | 10.4 | 0.97 |
| COMPARATIVE EXAMPLE 50 | 80 | 20 | 12.2 | 10.4 | 1.17 |

FIG. 7

| | RATIO OF GRAPHITE [mass%] | RATIO OF NON-GRAPHITIZABLE CARBON [mass%] | GRAPHITE PARTICLE SIZE (DG) [μm] | NON-GRAPHITIZABLE CARBON PARTICLE SIZE [μm] | DG/DN |
|---|---|---|---|---|---|
| COMPARATIVE EXAMPLE 51 | 55 | 45 | 1.5 | 1.5 | 1.00 |
| COMPARATIVE EXAMPLE 52 | 55 | 45 | 1.5 | 2.1 | 0.71 |
| EXAMPLE 61 | 55 | 45 | 2.1 | 2.1 | 1.00 |
| COMPARATIVE EXAMPLE 53 | 55 | 45 | 4.5 | 2.1 | 2.14 |
| COMPARATIVE EXAMPLE 54 | 55 | 45 | 1.5 | 4.5 | 0.33 |
| EXAMPLE 62 | 55 | 45 | 2.1 | 4.5 | 0.47 |
| EXAMPLE 63 | 55 | 45 | 4.5 | 4.5 | 1.00 |
| COMPARATIVE EXAMPLE 55 | 55 | 45 | 6.3 | 4.5 | 1.40 |
| COMPARATIVE EXAMPLE 56 | 55 | 45 | 1.5 | 6.2 | 0.24 |
| EXAMPLE 64 | 55 | 45 | 2.1 | 6.2 | 0.34 |
| EXAMPLE 65 | 55 | 45 | 4.5 | 6.2 | 0.73 |
| EXAMPLE 66 | 55 | 45 | 6.3 | 6.2 | 1.02 |
| COMPARATIVE EXAMPLE 57 | 55 | 45 | 8.3 | 6.2 | 1.34 |
| COMPARATIVE EXAMPLE 58 | 55 | 45 | 1.5 | 8.1 | 0.19 |
| EXAMPLE 67 | 55 | 45 | 2.1 | 8.1 | 0.26 |
| EXAMPLE 68 | 55 | 45 | 4.5 | 8.1 | 0.56 |
| EXAMPLE 69 | 55 | 45 | 6.3 | 8.1 | 0.78 |
| EXAMPLE 70 | 55 | 45 | 8.3 | 8.1 | 1.02 |
| COMPARATIVE EXAMPLE 59 | 55 | 45 | 10.1 | 8.1 | 1.28 |
| COMPARATIVE EXAMPLE 60 | 55 | 45 | 1.5 | 10.4 | 0.14 |
| EXAMPLE 71 | 55 | 45 | 2.1 | 10.4 | 0.20 |
| EXAMPLE 72 | 55 | 45 | 4.5 | 10.4 | 0.43 |
| EXAMPLE 73 | 55 | 45 | 6.3 | 10.4 | 0.61 |
| EXAMPLE 74 | 55 | 45 | 8.3 | 10.4 | 0.80 |
| EXAMPLE 75 | 55 | 45 | 10.1 | 10.4 | 0.97 |
| COMPARATIVE EXAMPLE 61 | 55 | 45 | 12.2 | 10.4 | 1.17 |
| COMPARATIVE EXAMPLE 62 | 0 | 100 | - | 1.5 | - |
| COMPARATIVE EXAMPLE 63 | 0 | 100 | - | 2.1 | - |
| COMPARATIVE EXAMPLE 64 | 0 | 100 | - | 4.5 | - |
| COMPARATIVE EXAMPLE 65 | 0 | 100 | - | 6.2 | - |
| COMPARATIVE EXAMPLE 66 | 0 | 100 | - | 8.1 | - |
| COMPARATIVE EXAMPLE 67 | 0 | 100 | - | 10.4 | - |

FIG. 8

| | INITIAL CAPACITY [Ah] | INITIAL INPUT [W] | CAPACITY REDUCTION RATE [%] | INPUT REDUCTION RATE [%] | CAPACITY AFTER CYCLE [Ah] | INPUT AFTER CYCLE [W] | CAPACITY AFTER CYCLE (COMPARATIVE EXAMPLE RATIO) [%] | INPUT AFTER CYCLE (COMPARATIVE EXAMPLE RATIO) [%] |
|---|---|---|---|---|---|---|---|---|
| COMPARATIVE EXAMPLE 1 | 6.78 | 139 | 40 | 42 | 4.07 | 81 | 100 | 100 |
| COMPARATIVE EXAMPLE 2 | 6.79 | 129 | 31 | 36 | 4.69 | 83 | 100 | 100 |
| COMPARATIVE EXAMPLE 3 | 6.79 | 115 | 27 | 34 | 4.96 | 76 | 100 | 100 |
| COMPARATIVE EXAMPLE 4 | 6.78 | 106 | 25 | 30 | 5.09 | 74 | 100 | 100 |
| COMPARATIVE EXAMPLE 5 | 6.79 | 98 | 23 | 28 | 5.23 | 71 | 100 | 100 |
| COMPARATIVE EXAMPLE 6 | 6.80 | 94 | 22 | 26 | 5.30 | 70 | 100 | 100 |
| COMPARATIVE EXAMPLE 7 | 6.77 | 82 | 21 | 24 | 5.35 | 62 | 100 | 100 |
| COMPARATIVE EXAMPLE 8 | 6.76 | 155 | 42 | 43 | 3.92 | 88 | 96 | 109 |
| COMPARATIVE EXAMPLE 9 | 6.75 | 153 | 40 | 45 | 4.05 | 84 | 100 | 104 |
| EXAMPLE 1 | 6.76 | 143 | 21 | 20 | 5.34 | 114 | 114 | 137 |
| COMPARATIVE EXAMPLE 10 | 6.76 | 129 | 35 | 34 | 4.39 | 85 | 89 | 112 |
| COMPARATIVE EXAMPLE 11 | 6.78 | 151 | 43 | 40 | 3.86 | 91 | 95 | 112 |
| EXAMPLE 2 | 6.76 | 141 | 15 | 13 | 5.75 | 123 | 123 | 148 |
| EXAMPLE 3 | 6.74 | 127 | 12 | 11 | 5.93 | 113 | 120 | 149 |
| COMPARATIVE EXAMPLE 12 | 6.76 | 116 | 32 | 30 | 4.60 | 81 | 90 | 109 |
| COMPARATIVE EXAMPLE 13 | 6.76 | 155 | 45 | 43 | 3.72 | 88 | 91 | 109 |
| EXAMPLE 4 | 6.75 | 139 | 20 | 21 | 5.40 | 110 | 115 | 133 |
| EXAMPLE 5 | 6.76 | 125 | 18 | 16 | 5.54 | 105 | 112 | 138 |
| EXAMPLE 6 | 6.76 | 116 | 15 | 14 | 5.75 | 100 | 113 | 135 |
| COMPARATIVE EXAMPLE 14 | 6.76 | 108 | 32 | 35 | 4.60 | 70 | 88 | 99 |
| COMPARATIVE EXAMPLE 15 | 6.76 | 148 | 50 | 49 | 3.38 | 75 | 83 | 93 |
| EXAMPLE 7 | 6.77 | 138 | 22 | 20 | 5.28 | 110 | 113 | 133 |
| EXAMPLE 8 | 6.76 | 124 | 20 | 18 | 5.41 | 102 | 109 | 134 |
| EXAMPLE 9 | 6.76 | 115 | 12 | 12 | 5.95 | 101 | 117 | 136 |
| EXAMPLE 10 | 6.76 | 107 | 10 | 7 | 6.08 | 100 | 116 | 141 |
| COMPARATIVE EXAMPLE 16 | 6.75 | 101 | 28 | 32 | 4.86 | 69 | 92 | 99 |
| COMPARATIVE EXAMPLE 17 | 6.76 | 146 | 40 | 42 | 4.06 | 85 | 100 | 105 |
| EXAMPLE 11 | 6.76 | 136 | 28 | 26 | 4.87 | 101 | 104 | 122 |
| EXAMPLE 12 | 6.76 | 122 | 20 | 18 | 5.41 | 100 | 109 | 132 |
| EXAMPLE 13 | 6.76 | 113 | 15 | 12 | 5.75 | 99 | 113 | 134 |
| EXAMPLE 14 | 6.77 | 105 | 12 | 10 | 5.96 | 95 | 114 | 134 |
| EXAMPLE 15 | 6.76 | 101 | 10 | 9 | 6.08 | 92 | 115 | 131 |
| COMPARATIVE EXAMPLE 18 | 6.76 | 89 | 31 | 30 | 4.66 | 62 | 87 | 100 |

FIG. 9

| | INITIAL CAPACITY [Ah] | INITIAL INPUT [W] | CAPACITY REDUCTION RATE [%] | INPUT REDUCTION RATE [%] | CAPACITY AFTER CYCLE [Ah] | INPUT AFTER CYCLE [W] | CAPACITY AFTER CYCLE (COMPARATIVE EXAMPLE RATIO) [%] | INPUT AFTER CYCLE (COMPARATIVE EXAMPLE RATIO) [%] |
|---|---|---|---|---|---|---|---|---|
| COMPARATIVE EXAMPLE 19 | 6.73 | 165 | 40 | 41 | 4.04 | 97 | 99 | 120 |
| COMPARATIVE EXAMPLE 20 | 6.73 | 163 | 41 | 39 | 3.97 | 99 | 98 | 122 |
| EXAMPLE 16 | 6.73 | 153 | 20 | 21 | 5.38 | 121 | 115 | 146 |
| COMPARATIVE EXAMPLE 21 | 6.73 | 139 | 30 | 36 | 4.71 | 89 | 95 | 117 |
| COMPARATIVE EXAMPLE 22 | 6.73 | 161 | 41 | 43 | 3.97 | 92 | 98 | 114 |
| EXAMPLE 17 | 6.72 | 151 | 19 | 22 | 5.44 | 118 | 116 | 142 |
| EXAMPLE 18 | 6.73 | 137 | 18 | 19 | 5.52 | 111 | 111 | 146 |
| COMPARATIVE EXAMPLE 23 | 6.73 | 126 | 32 | 30 | 4.58 | 88 | 90 | 119 |
| COMPARATIVE EXAMPLE 24 | 6.73 | 165 | 42 | 45 | 3.90 | 91 | 96 | 112 |
| EXAMPLE 19 | 6.73 | 149 | 22 | 23 | 5.25 | 115 | 112 | 139 |
| EXAMPLE 20 | 6.73 | 135 | 22 | 20 | 5.25 | 108 | 106 | 142 |
| EXAMPLE 21 | 6.74 | 126 | 20 | 19 | 5.39 | 102 | 106 | 138 |
| COMPARATIVE EXAMPLE 25 | 6.73 | 118 | 27 | 25 | 4.91 | 89 | 94 | 125 |
| COMPARATIVE EXAMPLE 26 | 6.73 | 158 | 41 | 43 | 3.97 | 90 | 98 | 111 |
| EXAMPLE 22 | 6.73 | 148 | 20 | 19 | 5.38 | 120 | 115 | 145 |
| EXAMPLE 23 | 6.73 | 134 | 20 | 19 | 5.38 | 109 | 108 | 143 |
| EXAMPLE 24 | 6.73 | 125 | 16 | 15 | 5.65 | 106 | 111 | 143 |
| EXAMPLE 25 | 6.73 | 117 | 14 | 14 | 5.79 | 101 | 111 | 142 |
| COMPARATIVE EXAMPLE 27 | 6.73 | 111 | 25 | 26 | 5.05 | 82 | 95 | 117 |
| COMPARATIVE EXAMPLE 28 | 6.71 | 156 | 40 | 40 | 4.03 | 94 | 99 | 116 |
| EXAMPLE 26 | 6.73 | 146 | 19 | 18 | 5.45 | 120 | 116 | 145 |
| EXAMPLE 27 | 6.73 | 132 | 16 | 18 | 5.65 | 108 | 114 | 142 |
| EXAMPLE 28 | 6.73 | 123 | 15 | 16 | 5.72 | 103 | 112 | 139 |
| EXAMPLE 29 | 6.74 | 115 | 14 | 13 | 5.80 | 100 | 111 | 141 |
| EXAMPLE 30 | 6.73 | 111 | 13 | 10 | 5.86 | 100 | 111 | 143 |
| COMPARATIVE EXAMPLE 29 | 6.73 | 99 | 24 | 26 | 5.11 | 73 | 96 | 118 |

FIG. 10

| | INITIAL CAPACITY [Ah] | INITIAL INPUT [W] | CAPACITY REDUCTION RATE [%] | INPUT REDUCTION RATE [%] | CAPACITY AFTER CYCLE [Ah] | INPUT AFTER CYCLE [W] | CAPACITY AFTER CYCLE (COMPARATIVE EXAMPLE RATIO) [%] | INPUT AFTER CYCLE (COMPARATIVE EXAMPLE RATIO) [%] |
|---|---|---|---|---|---|---|---|---|
| COMPARATIVE EXAMPLE 30 | 6.69 | 184 | 42 | 45 | 3.88 | 101 | 95 | 125 |
| COMPARATIVE EXAMPLE 31 | 6.69 | 179 | 40 | 41 | 4.01 | 106 | 99 | 131 |
| EXAMPLE 31 | 6.69 | 169 | 19 | 18 | 5.42 | 139 | 116 | 167 |
| COMPARATIVE EXAMPLE 32 | 6.70 | 155 | 36 | 32 | 4.29 | 105 | 86 | 138 |
| COMPARATIVE EXAMPLE 33 | 6.69 | 172 | 41 | 41 | 3.95 | 101 | 97 | 125 |
| EXAMPLE 32 | 6.67 | 162 | 19 | 20 | 5.40 | 130 | 115 | 157 |
| EXAMPLE 33 | 6.69 | 148 | 17 | 18 | 5.55 | 121 | 112 | 159 |
| COMPARATIVE EXAMPLE 33 | 6.69 | 136 | 30 | 31 | 4.68 | 94 | 92 | 127 |
| COMPARATIVE EXAMPLE 34 | 6.68 | 184 | 40 | 39 | 4.01 | 112 | 99 | 138 |
| EXAMPLE 34 | 6.70 | 159 | 20 | 21 | 5.36 | 126 | 114 | 152 |
| EXAMPLE 35 | 6.69 | 145 | 19 | 17 | 5.42 | 120 | 109 | 158 |
| EXAMPLE 36 | 6.69 | 136 | 19 | 19 | 5.42 | 110 | 106 | 149 |
| COMPARATIVE EXAMPLE 35 | 6.69 | 128 | 25 | 26 | 5.02 | 95 | 96 | 134 |
| COMPARATIVE EXAMPLE 36 | 6.69 | 176 | 43 | 42 | 3.81 | 102 | 94 | 126 |
| EXAMPLE 37 | 6.69 | 166 | 22 | 23 | 5.22 | 128 | 111 | 154 |
| EXAMPLE 38 | 6.71 | 152 | 16 | 18 | 5.64 | 125 | 114 | 164 |
| EXAMPLE 39 | 6.69 | 143 | 15 | 15 | 5.69 | 122 | 112 | 165 |
| EXAMPLE 40 | 6.69 | 135 | 14 | 11 | 5.75 | 120 | 110 | 169 |
| COMPARATIVE EXAMPLE 37 | 6.69 | 118 | 25 | 23 | 5.02 | 91 | 95 | 130 |
| COMPARATIVE EXAMPLE 38 | 6.69 | 163 | 40 | 42 | 4.01 | 95 | 99 | 117 |
| EXAMPLE 41 | 6.69 | 153 | 21 | 19 | 5.29 | 124 | 113 | 149 |
| EXAMPLE 42 | 6.67 | 139 | 17 | 14 | 5.54 | 120 | 112 | 158 |
| EXAMPLE 43 | 6.69 | 130 | 11 | 10 | 5.95 | 117 | 117 | 158 |
| EXAMPLE 44 | 6.69 | 122 | 9 | 10 | 6.09 | 110 | 116 | 155 |
| EXAMPLE 45 | 6.69 | 118 | 10 | 8 | 6.02 | 109 | 114 | 156 |
| COMPARATIVE EXAMPLE 39 | 6.69 | 106 | 28 | 31 | 4.82 | 73 | 90 | 118 |

FIG. 11

| | INITIAL CAPACITY [Ah] | INITIAL INPUT [W] | CAPACITY REDUCTION RATE [%] | INPUT REDUCTION RATE [%] | CAPACITY AFTER CYCLE [Ah] | INPUT AFTER CYCLE [W] | CAPACITY AFTER CYCLE (COMPARATIVE EXAMPLE RATIO) [%] | INPUT AFTER CYCLE (COMPARATIVE EXAMPLE RATIO) [%] |
|---|---|---|---|---|---|---|---|---|
| COMPARATIVE EXAMPLE 40 | 6.59 | 203 | 40 | 35 | 3.95 | 132 | 97 | 163 |
| COMPARATIVE EXAMPLE 41 | 6.60 | 194 | 39 | 40 | 4.02 | 116 | 99 | 143 |
| COMPARATIVE EXAMPLE 46 | 6.60 | 184 | 18 | 15 | 5.41 | 156 | 115 | 188 |
| EXAMPLE 42 | 6.62 | 170 | 32 | 30 | 4.50 | 119 | 91 | 157 |
| COMPARATIVE EXAMPLE 43 | 6.60 | 182 | 41 | 39 | 3.89 | 111 | 96 | 137 |
| EXAMPLE 47 | 6.60 | 172 | 15 | 14 | 5.61 | 148 | 120 | 178 |
| EXAMPLE 48 | 6.60 | 158 | 13 | 15 | 5.74 | 134 | 116 | 176 |
| COMPARATIVE EXAMPLE 44 | 6.61 | 146 | 30 | 29 | 4.63 | 104 | 91 | 141 |
| COMPARATIVE EXAMPLE 45 | 6.60 | 203 | 39 | 38 | 4.02 | 126 | 99 | 156 |
| EXAMPLE 49 | 6.60 | 169 | 25 | 25 | 4.95 | 127 | 106 | 153 |
| EXAMPLE 50 | 6.60 | 155 | 20 | 21 | 5.28 | 122 | 106 | 161 |
| EXAMPLE 51 | 6.62 | 146 | 18 | 15 | 5.43 | 124 | 107 | 168 |
| COMPARATIVE EXAMPLE 46 | 6.60 | 138 | 16 | 15 | 5.54 | 117 | 106 | 165 |
| COMPARATIVE EXAMPLE 47 | 6.60 | 175 | 42 | 40 | 3.83 | 105 | 94 | 130 |
| EXAMPLE 52 | 6.60 | 165 | 23 | 25 | 5.08 | 124 | 108 | 149 |
| EXAMPLE 53 | 6.60 | 151 | 19 | 21 | 5.34 | 119 | 108 | 157 |
| EXAMPLE 54 | 6.61 | 142 | 15 | 17 | 5.62 | 118 | 110 | 159 |
| EXAMPLE 55 | 6.60 | 134 | 15 | 14 | 5.61 | 115 | 107 | 162 |
| COMPARATIVE EXAMPLE 48 | 6.60 | 124 | 28 | 24 | 4.75 | 94 | 90 | 134 |
| COMPARATIVE EXAMPLE 49 | 6.58 | 169 | 43 | 45 | 3.75 | 93 | 92 | 115 |
| EXAMPLE 56 | 6.60 | 159 | 21 | 24 | 5.21 | 121 | 111 | 146 |
| EXAMPLE 57 | 6.60 | 145 | 17 | 19 | 5.48 | 117 | 110 | 154 |
| EXAMPLE 58 | 6.60 | 136 | 14 | 17 | 5.67 | 113 | 111 | 153 |
| EXAMPLE 59 | 6.60 | 128 | 15 | 18 | 5.61 | 105 | 107 | 148 |
| EXAMPLE 60 | 6.59 | 124 | 16 | 17 | 5.54 | 103 | 105 | 147 |
| COMPARATIVE EXAMPLE 50 | 6.60 | 112 | 24 | 22 | 5.01 | 87 | 94 | 140 |

FIG. 12

| | INITIAL CAPACITY [Ah] | INITIAL INPUT [W] | CAPACITY REDUCTION RATE [%] | INPUT REDUCTION RATE [%] | CAPACITY AFTER CYCLE [Ah] | INPUT AFTER CYCLE [W] | CAPACITY AFTER CYCLE (COMPARATIVE EXAMPLE RATIO) [%] | INPUT AFTER CYCLE (COMPARATIVE EXAMPLE RATIO) [%] |
|---|---|---|---|---|---|---|---|---|
| COMPARATIVE EXAMPLE 51 | 6.15 | 299 | 38 | 35 | 3.81 | 194 | 94 | 240 |
| COMPARATIVE EXAMPLE 52 | 6.13 | 277 | 36 | 37 | 3.92 | 175 | 96 | 216 |
| EXAMPLE 61 | 6.13 | 267 | 20 | 19 | 4.91 | 216 | 105 | 260 |
| COMPARATIVE EXAMPLE 53 | 6.13 | 253 | 27 | 26 | 4.48 | 187 | 90 | 246 |
| COMPARATIVE EXAMPLE 54 | 6.11 | 247 | 35 | 30 | 3.97 | 173 | 98 | 214 |
| EXAMPLE 62 | 6.13 | 237 | 21 | 19 | 4.84 | 192 | 103 | 231 |
| EXAMPLE 63 | 6.13 | 223 | 18 | 17 | 5.03 | 185 | 101 | 243 |
| COMPARATIVE EXAMPLE 55 | 6.12 | 206 | 28 | 29 | 4.41 | 146 | 87 | 197 |
| COMPARATIVE EXAMPLE 56 | 6.13 | 299 | 37 | 34 | 3.86 | 197 | 95 | 243 |
| EXAMPLE 64 | 6.13 | 229 | 19 | 17 | 4.97 | 190 | 106 | 229 |
| EXAMPLE 65 | 6.11 | 215 | 15 | 17 | 5.19 | 178 | 105 | 234 |
| EXAMPLE 66 | 6.13 | 206 | 16 | 14 | 5.15 | 177 | 101 | 239 |
| COMPARATIVE EXAMPLE 57 | 6.13 | 198 | 27 | 25 | 4.48 | 149 | 86 | 210 |
| COMPARATIVE EXAMPLE 58 | 6.14 | 229 | 38 | 32 | 3.81 | 156 | 94 | 193 |
| EXAMPLE 67 | 6.13 | 219 | 20 | 19 | 4.91 | 177 | 105 | 213 |
| EXAMPLE 68 | 6.13 | 205 | 16 | 14 | 5.15 | 176 | 104 | 232 |
| EXAMPLE 69 | 6.14 | 196 | 13 | 14 | 5.34 | 169 | 105 | 228 |
| EXAMPLE 70 | 6.12 | 188 | 15 | 12 | 5.20 | 165 | 99 | 232 |
| COMPARATIVE EXAMPLE 59 | 6.13 | 169 | 26 | 27 | 4.54 | 123 | 86 | 176 |
| COMPARATIVE EXAMPLE 60 | 6.13 | 214 | 36 | 31 | 3.92 | 148 | 96 | 183 |
| EXAMPLE 71 | 6.13 | 204 | 17 | 16 | 5.09 | 171 | 109 | 206 |
| EXAMPLE 72 | 6.12 | 190 | 14 | 11 | 5.26 | 169 | 106 | 222 |
| EXAMPLE 73 | 6.13 | 181 | 12 | 14 | 5.40 | 156 | 106 | 211 |
| EXAMPLE 74 | 6.13 | 173 | 10 | 11 | 5.52 | 154 | 106 | 217 |
| EXAMPLE 75 | 6.13 | 169 | 11 | 12 | 5.46 | 149 | 103 | 213 |
| COMPARATIVE EXAMPLE 61 | 6.14 | 157 | 24 | 22 | 4.67 | 122 | 87 | 197 |
| COMPARATIVE EXAMPLE 62 | 5.13 | 311 | 26 | 38 | 3.80 | 193 | 93 | 238 |
| COMPARATIVE EXAMPLE 63 | 5.18 | 294 | 15 | 32 | 4.40 | 200 | 94 | 241 |
| COMPARATIVE EXAMPLE 64 | 5.16 | 241 | 10 | 26 | 4.64 | 178 | 94 | 234 |
| COMPARATIVE EXAMPLE 65 | 5.19 | 218 | 12 | 25 | 4.57 | 163 | 90 | 220 |
| COMPARATIVE EXAMPLE 66 | 5.17 | 199 | 15 | 22 | 4.39 | 155 | 84 | 218 |
| COMPARATIVE EXAMPLE 67 | 5.18 | 175 | 18 | 21 | 4.25 | 138 | 80 | 197 |

FIG. 15

| | RATIO OF GRAPHITE [mass%] | RATIO OF NON-GRAPHITIZABLE CARBON [mass%] | GRAPHITE PARTICLE SIZE (DG) [μm] | NON-GRAPHITIZABLE CARBON PARTICLE SIZE (DN)[μm] | DG/DN | CAPACITY AFTER CYCLE [Ah] | INPUT AFTER CYCLE [W] | CAPACITY AFTER CYCLE (COMPARATIVE EXAMPLE RATIO) [%] | INPUT AFTER CYCLE (COMPARATIVE EXAMPLE RATIO) [%] |
|---|---|---|---|---|---|---|---|---|---|
| COMPARATIVE EXAMPLE 1 | 100 | 0 | 1.5 | - | - | 4.07 | 81 | 100 | 100 |
| COMPARATIVE EXAMPLE 2 | 100 | 0 | 2.1 | - | - | 4.69 | 83 | 100 | 100 |
| COMPARATIVE EXAMPLE 3 | 100 | 0 | 4.5 | - | - | 4.96 | 76 | 100 | 100 |
| COMPARATIVE EXAMPLE 4 | 100 | 0 | 6.3 | - | - | 5.09 | 74 | 100 | 100 |
| COMPARATIVE EXAMPLE 5 | 100 | 0 | 8.3 | - | - | 5.23 | 71 | 100 | 100 |
| COMPARATIVE EXAMPLE 6 | 100 | 0 | 10.1 | - | - | 5.30 | 70 | 100 | 100 |
| COMPARATIVE EXAMPLE 7 | 100 | 0 | 12.2 | - | - | 5.35 | 62 | 100 | 100 |
| COMPARATIVE EXAMPLE 8 | 95 | 5 | 1.5 | 1.5 | 1.00 | 3.92 | 88 | 96 | 109 |
| EXAMPLE 1 | 95 | 5 | 2.1 | 2.1 | 1.00 | 5.34 | 114 | 114 | 137 |
| EXAMPLE 3 | 95 | 5 | 4.5 | 4.5 | 1.00 | 5.93 | 113 | 120 | 149 |
| EXAMPLE 6 | 95 | 5 | 6.3 | 6.2 | 1.02 | 5.75 | 100 | 113 | 135 |
| EXAMPLE 10 | 95 | 5 | 8.3 | 8.1 | 1.02 | 6.08 | 100 | 116 | 141 |
| EXAMPLE 15 | 95 | 5 | 10.1 | 10.4 | 0.97 | 6.08 | 92 | 115 | 131 |
| COMPARATIVE EXAMPLE 19 | 90 | 10 | 1.5 | 1.5 | 1.00 | 4.04 | 97 | 99 | 120 |
| EXAMPLE 16 | 90 | 10 | 2.1 | 2.1 | 1.00 | 5.38 | 121 | 115 | 146 |
| EXAMPLE 18 | 90 | 10 | 4.5 | 4.5 | 1.00 | 5.52 | 111 | 111 | 146 |
| EXAMPLE 21 | 90 | 10 | 6.3 | 6.2 | 1.02 | 5.39 | 102 | 106 | 138 |
| EXAMPLE 25 | 90 | 10 | 8.3 | 8.1 | 1.02 | 5.79 | 101 | 111 | 142 |
| EXAMPLE 30 | 90 | 10 | 10.1 | 10.4 | 0.97 | 5.86 | 100 | 111 | 143 |
| COMPARATIVE EXAMPLE 30 | 85 | 15 | 1.5 | 1.5 | 1.00 | 3.88 | 101 | 95 | 125 |
| EXAMPLE 31 | 85 | 15 | 2.1 | 2.1 | 1.00 | 5.42 | 139 | 116 | 167 |
| EXAMPLE 33 | 85 | 15 | 4.5 | 4.5 | 1.00 | 5.55 | 121 | 112 | 159 |
| EXAMPLE 36 | 85 | 15 | 6.3 | 6.2 | 1.02 | 5.42 | 110 | 106 | 149 |
| EXAMPLE 40 | 85 | 15 | 8.3 | 8.1 | 1.02 | 5.75 | 120 | 110 | 169 |
| EXAMPLE 45 | 85 | 15 | 10.1 | 10.4 | 0.97 | 6.02 | 109 | 114 | 156 |
| COMPARATIVE EXAMPLE 40 | 80 | 20 | 1.5 | 1.5 | 1.00 | 3.95 | 132 | 97 | 163 |
| EXAMPLE 46 | 80 | 20 | 2.1 | 2.1 | 1.00 | 5.41 | 156 | 115 | 188 |
| EXAMPLE 48 | 80 | 20 | 4.5 | 4.5 | 1.00 | 5.74 | 134 | 116 | 176 |
| EXAMPLE 51 | 80 | 20 | 6.3 | 6.2 | 1.02 | 5.43 | 124 | 107 | 168 |
| EXAMPLE 55 | 80 | 20 | 8.3 | 8.1 | 1.02 | 5.61 | 115 | 107 | 162 |
| EXAMPLE 60 | 80 | 20 | 10.1 | 10.4 | 0.97 | 5.54 | 103 | 105 | 147 |
| COMPARATIVE EXAMPLE 51 | 55 | 45 | 1.5 | 1.5 | 1.00 | 3.81 | 194 | 94 | 240 |
| EXAMPLE 61 | 55 | 45 | 2.1 | 2.1 | 1.00 | 4.91 | 216 | 105 | 260 |
| EXAMPLE 63 | 55 | 45 | 4.5 | 4.5 | 1.00 | 5.03 | 185 | 101 | 243 |
| EXAMPLE 66 | 55 | 45 | 6.3 | 6.2 | 1.02 | 5.15 | 177 | 101 | 239 |
| EXAMPLE 70 | 55 | 45 | 8.3 | 8.1 | 1.02 | 5.20 | 165 | 99 | 232 |
| EXAMPLE 75 | 55 | 45 | 10.1 | 10.4 | 0.97 | 5.46 | 149 | 103 | 213 |

ENERGY STORAGE DEVICE AND ENERGY STORAGE APPARATUS

CROSS-REFERENCE TO RELATED APPLICATIONS

This application is based on Japanese Patent Application No. 2015-110296 filed on May 29, 2015, the entire contents of which are hereby incorporated by reference.

FIELD

A technology described in the present specification relates to an energy storage device and an energy storage apparatus.

BACKGROUND

Heretofore, an energy storage device described in JP-A-11-250909 is known, for example. This energy storage device includes a positive electrode, and a negative electrode capable of absorbing/desorbing lithium ions. The negative electrode has a negative active material containing a composite carbon material including graphite and non-graphitizable carbon.

The graphite has a high capacity and is excellent in potential flatness; however, absorption/desorption performance of lithium ions is deteriorated when repeating charge-discharge. On the other hand, the non-graphitizable carbon has a smaller capacity and a lower power potential at a low SOC region than the graphite; however, absorption/desorption performance of lithium ions is hardly deteriorated when repeating charge-discharge.

In a conventional technology, it is said that a secondary battery having a large capacity and excellent cycle performance can be obtained by employing a constitution in which the negative electrode includes graphite and non-graphitizable carbon.

However, it is difficult to adequately improve the input performance of the secondary battery even by the conventional technology, and so it has been thought to improve input performance by reducing a particle size of a negative active material.

However, the cycle performance may be deteriorated when the particle size of the graphite and the particle size of the non-graphitizable carbon are simply decreased.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage device which improves input performance while suppressing deterioration of cycle performance.

An energy storage device according to an aspect of the present invention includes a positive electrode and a negative electrode. The negative electrode comprises graphite and non-graphitizable carbon, a D50 particle size of the graphite at which a cumulative volume in a particle size distribution of a particle size reaches 50% is 2 μm or more, and a ratio of a mass of the non-graphitizable carbon to a total amount of a mass of the graphite and a mass of the non-graphitizable carbon is 5% by mass or more and 45% by mass or less. A ratio of the D50 particle size of the graphite to a D50 particle size of the non-graphitizable carbon is 1.02 or less.

BRIEF DESCRIPTION OF DRAWINGS

The foregoing and other features of the present invention will become apparent from the following description and drawings of an illustrative embodiment of the invention in which:

FIG. 3 is a view showing a constitution of a negative active material of Comparative Examples 1 to 18 and Examples 1 to 15.

FIG. 4 is a view showing a constitution of a negative active material of Comparative Examples 19 to 29 and Examples 16 to 30.

FIG. 5 is a view showing a constitution of a negative active material of Comparative Examples 30 to 39 and Examples 31 to 45.

FIG. 6 is a view showing a constitution of a negative active material of Comparative Examples 40 to 50 and Examples 46 to 60.

FIG. 7 is a view showing a constitution of a negative active material of Comparative Examples 51 to 67 and Examples 61 to 75.

FIG. 8 is a view showing measurement results of an energy storage device of Comparative Examples 1 to 18 and Examples 1 to 15.

FIG. 9 is a view showing measurement results of an energy storage device of Comparative Examples 19 to 29 and Examples 16 to 30.

FIG. 10 is a view showing measurement results of an energy storage device of Comparative Examples 30 to 39 and Examples 31 to 45.

FIG. 11 is a view showing measurement results of an energy storage device of Comparative Examples 40 to 50 and Examples 46 to 60.

FIG. 12 is a view showing measurement results of an energy storage device of Comparative Examples 51 to 67 and Examples 61 to 75.

FIG. 15 is a view showing a constitution of the negative active material and measurement results in varying a D50 particle size of graphite.

DESCRIPTION OF EMBODIMENTS (Overview of Embodiment)

Figure 1:
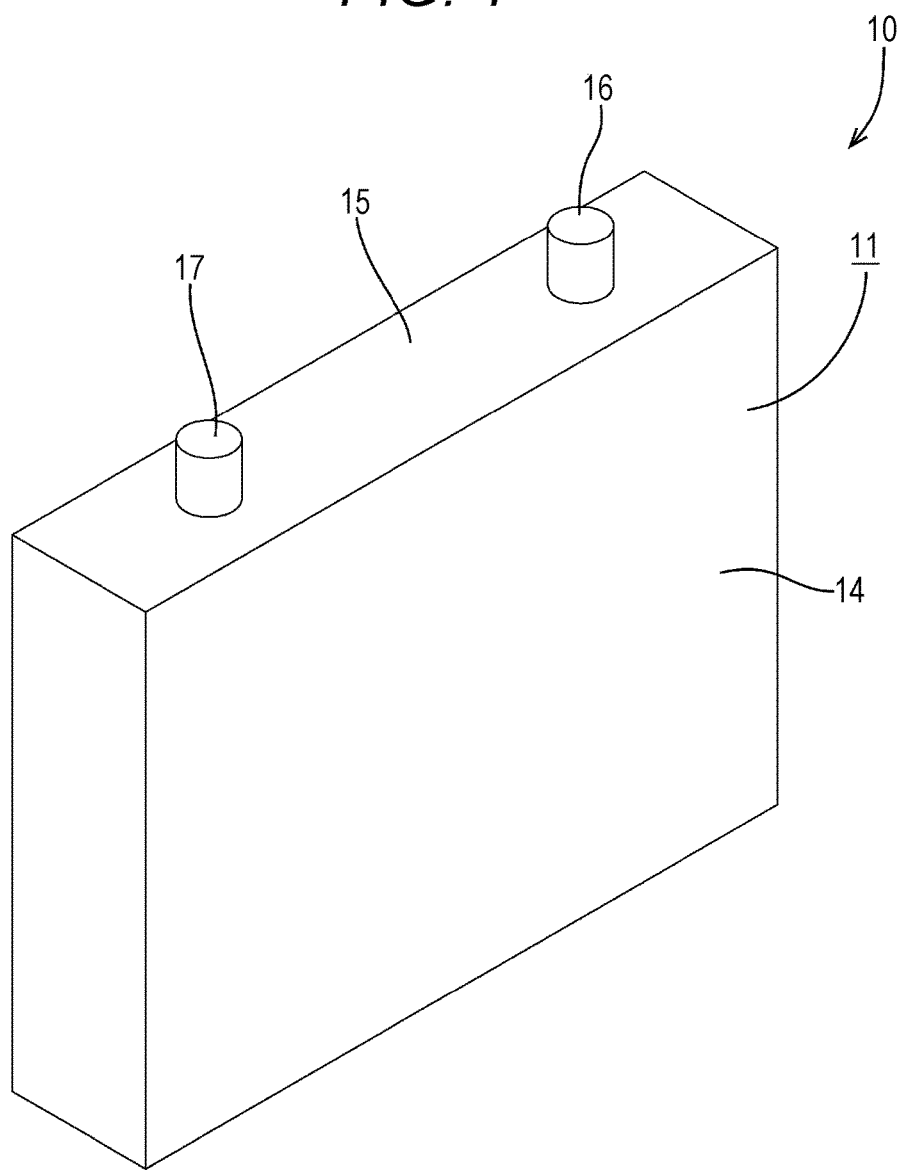
FIG. 1 is a perspective view showing an energy storage device of Embodiment 1.

The technology described in the present specification pertains to an energy storage device according to an aspect of the present invention including a positive electrode and a negative electrode. The negative electrode contains graphite and non-graphitizable carbon, and a D50 particle size of the graphite at which a cumulative volume in a particle size distribution of a particle size reaches 50% is 2 or more. A ratio of a mass of the non-graphitizable carbon to a total amount of a mass of the graphite and a mass of the non-graphitizable carbon is 5% by mass or more and 45% by mass or less. A ratio of the D50 particle size of the graphite to a D50 particle size of the non-graphitizable carbon is 1.02 or less.

In accordance with the present constitution, an input of the energy storage device can be improved and a reduction of a capacity after cycle can be suppressed. It is thought that this is for following reason.

At first, when the negative electrode has graphite and non-graphitizable carbon, it is possible to attain an energy storage device having a large capacity and excellent cycle performance.

Further, when the D50 particle size of the graphite is set to 2 μm or more, input performance can be improved.

By setting a ratio of a mass of non-graphitizable carbon to a sum of a mass of non-graphitizable carbon and a mass of graphite to 5% by mass or more and 45% by mass or less, a reduction of a capacity after cycle of the energy storage device can be suppressed.

When a ratio of the D50 particle size of the graphite to the D50 particle size of the non-graphitizable carbon is set to 1.02 or less, capacity retention and input performance of the energy storage device after repeated charge and discharge can be improved. It is thought that this is for following reason. Setting the ratio of the D50 particle size of the graphite to the D50 particle size of the non-graphitizable carbon to a value exceeding 1.02 means that a particle size of the graphite becomes relatively larger compared with the non-graphitizable carbon. Since volumetric expansion or contraction associated with charge-discharge of the graphite is relatively large, if expansion and contraction of the graphite is repeated due to repeated charge-discharge, part of the graphite is separated and cut off of a conductive path easily occurs. When the particle size of the graphite becomes relatively larger compared with the non-graphitizable carbon, it is thought that the influence on input performance and capacity retention due to cut off of the conductive path becomes large.

In the above-mentioned energy storage device, the D50 particle size of the graphite is preferably 2 μm or more and the 6.3 μm or less.

In accordance with the present constitution, an absolute value of the input after cycle can be improved. The reason for this is supposed that by setting the D50 particle size of the graphite to 2 μm or more and 6.3 μm or less, cut off of a conductive path associated with repeated cycles of charge-discharge is suppressed.

In the above-mentioned energy storage device, the D50 particle size of the graphite is preferably 2 μm or more and the 4.5 μm or less.

In accordance with the present constitution, an absolute value of the input after cycle can be more improved.

In the above-mentioned energy storage device, it is preferred that a ratio of a mass of the non-graphitizable carbon to a total amount of a mass of the graphite and a mass of the non-graphitizable carbon is 5% by mass or more and 20% by mass or less.

In accordance with the present constitution, the capacity after cycle can be improved. The reason for this is supposed that by setting the ratio of a mass of non-graphitizable carbon having excellent cycle performance to 5% by mass or more and 20% by mass or less with respect to a sum of a mass of graphite and a mass of non-graphitizable carbon, the capacity after cycle has been improved.

In the above-mentioned energy storage device, it is preferred that the D50 particle size of the non-graphitizable carbon is 2 μm or more and 4.5 μm or less.

In accordance with the present constitution, the capacity after cycle and the input after cycle can be more improved. The reason for this is supposed that by setting the D50 particle size of the non-graphitizable carbon to 2 μm or more and 4.5 μm or less, a capacity and input performance after repeating charge-discharge is improved.

In the above-mentioned energy storage device, it is preferred that a ratio of a mass of the non-graphitizable carbon to a total amount of a mass of the graphite and a mass of the non-graphitizable carbon is 15% by mass or more and 20% by mass or less.

In accordance with the present constitution, the input after cycle can be improved while maintaining a capacity after cycle nearly equal to the capacity after cycle of the energy storage device in which a ratio of a mass of non-graphitizable carbon to a total amount of a mass of graphite and a mass of non-graphitizable carbon is 5% by mass or more and 10% by mass or less. The reason for this is supposed that by setting the ratio of a mass of non-graphitizable carbon having excellent cycle performance to 15% by mass or more and 20% by mass or less with respect to a sum of a mass of graphite and a mass of non-graphitizable carbon, the input after cycle has been more improved.

<Embodiment 1>

Hereinafter, Embodiment 1 will be described with reference to FIG. 1 to FIG. 14. An energy storage device 10 of Embodiment 1 is mounted on vehicles (not shown) such as electric vehicles and hybrid automobiles, and used as a power source. The energy storage device 10 of Embodiment 1 is a lithium ion battery and formed by housing an electrode group 20 in a case 11. The electrode group 20 includes a positive electrode plate (corresponding to a positive electrode) 18, a negative electrode plate (corresponding to a negative electrode) 19, a separator, and an electrolyte solution (not shown). Incidentally, the energy storage device 10 is not limited to a lithium ion battery, and an optional storage battery can be selected as required.

As shown in FIG. 1, the case 11 has a flat rectangular parallelepiped shape. The case 11 may be made of metal, or may be made of a synthetic resin. As the metal constituting the case 11, as required, an optional metal of iron, an iron alloy, aluminum, an aluminum alloy or the like can be selected. As the synthetic resin constituting the case 11, as required, an optional synthetic resin of polypropylene (PP), polyethylene or the like can be selected.

The case 11 includes a case main body 14 opened upward, and a lid 15 attached to the case main body 14 to block the opening of the case main body 14. The lid 15 is formed into an approximately the same shape as the opening of the case main body 14. A positive terminal 16 and a negative terminal 17 are arranged on an upper surface of the lid 15, protruding upward. The positive terminal 16 is electrically connected to a positive electrode plate 18 in the case 11 by a publicly known method. Further, the negative terminal 17 is electrically connected to a negative electrode plate 19 in the case 11 by a publicly known method.

Figure 2:
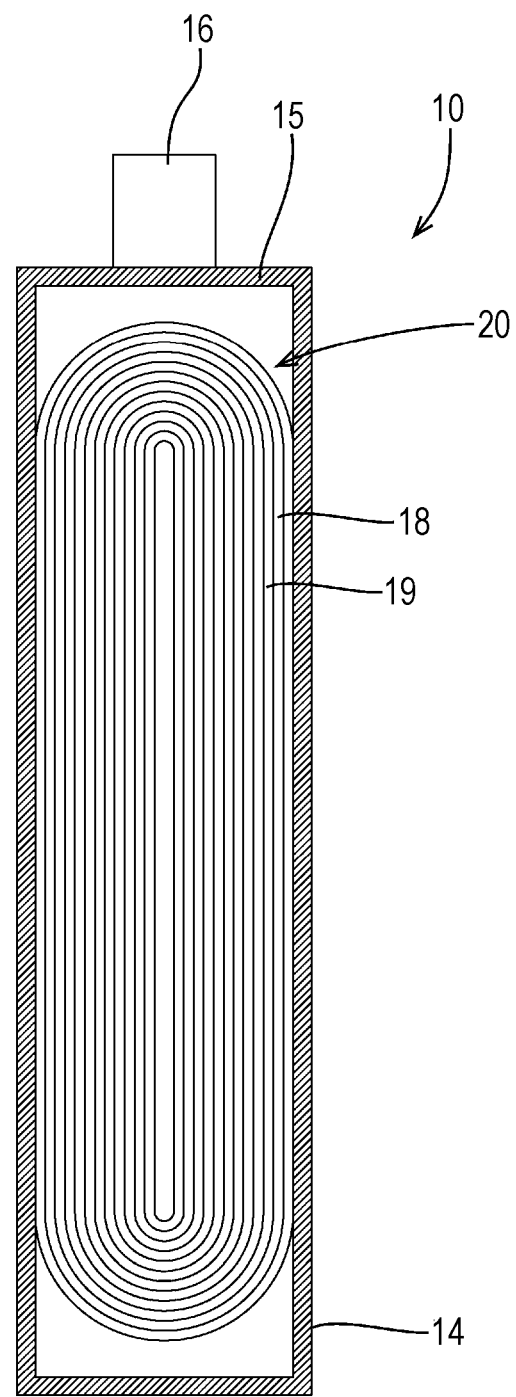
FIG. 2 is a sectional view showing the energy storage device of Embodiment 1.

As shown in FIG. 2, in the case 11, the electrode group 20 formed by superimposing the positive electrode plate 18, the separator, and the negative electrode plate 19, and winding the entire stack is housed. Further, an electrolyte solution is injected in the case 11.

The positive electrode plate 18 is formed by forming a positive composite layer on one or both surfaces of a metallic positive electrode foil. A positive composite contains a positive active material and a positive binder. The positive composite may further contain a conductive additive. The positive electrode foil has a metallic foil form. The positive electrode foil of the present embodiment is formed of aluminum or an aluminum alloy.

As the positive active material, publicly known materials can be appropriately used as long as they are positive active materials capable of absorbing/releasing lithium ions. For example, as the positive active material, composite oxides represented by $Li_xMO_y$ (M represents at least one transition metal), or polyanion compounds represented by $Li_wMe_x(XO_y)_z$ (Me represents at least one transition metal and X is, for example, P, Si, B, V) can be used. Examples of composite oxides are $Li_xCoO_2$, $Li_xNiO_2$, $Li_xMn_2O_4$, $Li_xMnO_3$, $Li_xNi_yCo_{(1-y)}O_2$, $Li_xNi_yMn_zCo_{(1-y-z)}O_2$, $Li_xNi_yMn_{(2-y)}O_4$, and the like. Examples of polyanion compounds are $LiFePO_4$, $LiMnPO_4$, $LiNiPO_4$, $LiCoPO_4$, $Li_3V_2(PO_4)_3$, $Li_2MnSiO_4$, $Li_2CoPO_4F$ and the like. A part of elements or polyanions in these compounds may be substituted with another element or anion species, or the surface of the active material may be coated with a metal oxide such as $ZrO_2$, MgO, and $Al_2O_3$ or carbon. Moreover, as the positive active material, conductive polymers such as disulfide, polypyrrole, polyaniline, polyparastyrene, polyacetylene and polyacene materials; and carbonaceous materials having a pseudo-graphite structure may be used; however, the material of the positive active material is not limited to these materials. In the positive active material, these compounds may be used singly or may be used as a mixture of two or more thereof.

A type of the conductive additive is not particularly limited, and it may be metal or may be nonmetal. As a metal conductive additive, a material formed of a metal element such as copper or nickel may be used. Further, as the nonmetallic conductive agent, carbon materials such as graphite, carbon black, acetylene black and Ketjen Black (registered trade mark) can be used. These conductive additives may be used singly or may be used as a mixture of two or more thereof.

A type of the positive binder is not particularly limited as long as it is stable to a solvent or an electrolyte solution used in manufacturing an electrode and stable to an oxidation-reduction reaction during charging/discharging. For example, when an aqueous solvent is used for a composition of the positive composite, as a positive binder, water-soluble or water-dispersible polymers, for example, cellulose-based polymers such as carboxymethyl cellulose (CMC) and hydroxypropyl methylcellulose (HPMC); polyvinyl alcohol (PVA); fluorine-based resins such as polytetrafluoroethylene (PTFE) and a tetrafluoroethylene-hexafluoropropylene copolymer (FEP); a vinylacetate copolymer; and rubbers such as a styrene-butadiene rubber (SBR) and an acrylic acid-modified SBR resin (SBR-based latex) can be preferably employed. Further, when a nonaqueous solvent is used for the composition of the positive composite, as a positive binder, polymers such as polyvinylidene fluoride (PVDF) and polyvinylidene chloride (PVDC) can be preferably employed. These positive binders may be used singly or may be used as a mixture of two or more thereof. Incidentally, the polymer material exemplified in the above can be used for the purpose of achieving a function as the thickener and other additives of the above-mentioned composition in addition to a function as the binder.

Further, as required, the positive composite may contain a positive electrode thickener or the like. As the positive electrode thickener, as required, an optional compound of polysaccharides such as methyl cellulose (MC) or carboxymethyl cellulose (CMC), sodium salts or ammonium salts of these polysaccharides, and N-methylpyrrolidone (NMP), can be appropriately selected.

One or both surfaces of the positive electrode foil is coated with a positive paste by a publicly known technique such as a reverse roll method, a direct roll method, a blade method, a knife method, and dipping method.

Thereafter, the positive electrode plate is pressed to a predetermined thickness, and then dried in a drying step.

(Negative Electrode Plate 19)

The negative electrode plate 19 is formed by forming a negative composite layer on one or both surfaces of a negative electrode foil. A negative composite contains a negative active material and a negative binder. The negative composite may further contain a conductive additive or a negative electrode thickener. The negative electrode foil has a metallic foil form. The negative electrode foil of the present embodiment is formed of copper or a copper alloy.

The negative active material of the present embodiment contains at least non-graphitizable carbon and graphite. Examples of graphite include natural graphite and artificial graphite. The negative active material is preferably artificial graphite. The artificial graphite can be obtained, for example, by firing the easily-graphitizable carbon. The graphite preferably has an interlayer distance d002 of 0.337 nm or less. The non-graphitizable carbon can be obtained from a carbon material formed by firing a petroleum pitch, polyacene, polysiloxane, polyparaphenylene, polyfurfuryl alcohol or the like at a predetermined temperature. The non-graphitizable carbon preferably has an interlayer distance d002 of 0.37 nm or more.

The negative active material may further contain a carbon material, other elements which are capable of alloying with lithium, an alloy, a metal oxide, a metal sulfide, or a metal nitride, or the like. An example of the carbon material is easily-graphitizable carbon.

Examples of the elements capable of alloying with lithium include Al, Si, Zn, Ge, Cd, Sn, and Pb. These elements may be contained singly, or may be contained in combination of two or more thereof. Further, examples of the alloy include alloys including transition metal elements, such as a Ni—Si alloy, a Ti—Si alloy and the like. Examples of the metal oxide include amorphous tin oxides such as $SnB_{0.4}P_{0.6}O_{3.1}$, tin silicon oxide such as $SnSiO_3$, silicon oxide such as SiO, and lithium titanate having a spinel structure such as $Li_{4+x}Ti_5O_{12}$. Examples of the metal sulfide include lithium sulfide such as $TiS_2$, molybdenum sulfide such as $MoS_2$, and iron sulfide such as FeS, $FeS_2$ and $Li_xFeS_2$.

A ratio of the sum of the graphite and the non-graphitizable carbon in the negative composite is not particularly limited as long as it is in a range where the effect of the present technology is achieved; however, the ratio is preferably 70% by mass or more, more preferably 80% by mass or more, and moreover preferably 90% by mass or more. When the ratio of the graphite and the non-graphitizable carbon in the negative composite is 70% by mass or more, it is possible to obtain an energy storage device having more excellent cycle performance and more excellent input performance.

When a D50 particle size of the graphite at which a cumulative volume in a particle size distribution of a particle size reaches 50% is set to 2 μm or more, cycle performance can be improved. The reason for this is supposed that when the D50 particle size of the graphite is set to 2 μm or more, a current is prevented from centering at graphite having relatively low electric resistance and therefore lithium electrodeposition hardly takes place.

The D50 particle size of the graphite at which a cumulative volume in a particle size distribution of a particle size reaches 50% is preferably 2 µm or more and 11 µm or less, and more preferably 2 µm or more and 6.3 µm or less. When the D50 particle size of the graphite is set to 2 µm or more and 6.3 µm or less, an absolute value of the input after cycle can be improved. The reason for this is supposed that by setting the D50 particle size of the graphite to 2 µm or more and 6.3 µm or less, cut off of a conductive path associated with repeated cycles of charge-discharge is suppressed. Further, the D50 particle size of the graphite at which a cumulative volume in a particle size distribution of a particle size reaches 50% is more preferably 2 µm or more and 4.5 µm or less. The reason for this is that an absolute value of the input after cycle can be more improved.

A D50 particle size of the non-graphitizable carbon at which a cumulative volume in a particle size distribution of a particle size reaches 50% is preferably 2 µm or more and 11 µm or less, and more preferably 2 µm or more and 4.5 µm or less. When the D50 particle size of the non-graphitizable carbon is set to 2 µm or more and 4.5 µm or less, the capacity after cycle and the input after cycle can be improved. The reason for this is supposed that by setting the D50 particle size of the non-graphitizable carbon having excellent cycle performance to 2 µm or more and 4.5 µm or less, a capacity and input performance after repeating charge-discharge is improved.

Each of the D50 particle sizes of the graphite and the non-graphitizable carbon is a particle size at which a cumulative volume reaches 50% in a particle size distribution measured by a laser diffraction and scattering method according to JIS Z 8825: 2013.

A ratio of a mass of non-graphitizable carbon to a sum of a mass of non-graphitizable carbon and a mass of graphite is preferably set to 5% by mass or more and 45% by mass or less. The reason for this is that a reduction of a capacity after cycle of the energy storage device can be suppressed.

A ratio of a mass of non-graphitizable carbon to a total amount of a mass of non-graphitizable carbon and a mass of graphite is more preferably 5% by mass or more and 20% by mass or less. When the ratio of a mass of non-graphitizable carbon having excellent cycle performance is set to 5% by mass or more and 20% by mass or less with respect to a sum of a mass of graphite and a mass of non-graphitizable carbon, the capacity after cycle is improved.

A ratio of a mass of non-graphitizable carbon to a total amount of a mass of non-graphitizable carbon and a mass of graphite is particularly preferably 15% by mass or more and 20% by mass or less. When the ratio of a mass of non-graphitizable carbon having excellent cycle performance is set to 15% by mass or more and 20% by mass or less with respect to a sum of a mass of graphite and a mass of non-graphitizable carbon, the input after cycle is more improved.

A ratio of the D50 particle size of the graphite to the D50 particle size of the non-graphitizable carbon is preferably 1.02 or less. The reason for this is that cycle performance of the energy storage device can be improved. It is thought that this is for following reason. Setting the ratio of the D50 particle size of the graphite to the D50 particle size of the non-graphitizable carbon to a value exceeding 1.02 means that a particle size of the graphite becomes relatively larger compared with the non-graphitizable carbon. Since volumetric expansion or contraction associated with charge-discharge of the graphite is relatively large, if expansion and contraction of the graphite is repeated due to repeated charge-discharge, part of the graphite is separated and cut off of a conductive path easily occurs. When the particle size of the graphite becomes relatively larger compared with the non-graphitizable carbon, it is thought that the effect of input reduction due to cut off of the conductive becomes large.

The ratio of the D50 particle size of the graphite to the D50 particle size of the non-graphitizable carbon is preferably 0.2 or more.

It is preferred that the ratio of a mass of non-graphitizable carbon to a total amount of a mass of graphite and a mass of non-graphitizable carbon is 5% by mass or more and 20% by mass or less, and the ratio of the D50 particle size of the graphite to the D50 particle size of the non-graphitizable carbon is 0.48 or more and 1.02 or less. In accordance with the present constitution, since a reduction rate of a capacity after cycle can be reduced, it is possible to attain an energy storage device having more excellent life performance.

A type of the conductive additive contained in the negative composite is not particularly limited as long as it has an electron conducting property. As the conductive additive, for example, graphites such as natural graphites (flaky graphite), artificial graphites and expanded graphites; carbon blacks such as acetylene black, Ketjen black (registered trademark), channel black, furnace black, lampblack and thermal black; conductive fibers such as carbon fibers and metal fibers; metal powders such as copper and nickel; or organic conductive materials such as polyphenylene derivatives can be used. These negative conductive additives may be used singly or may be used as a mixture of two or more thereof. Among these negative conductive additives, artificial graphites, acetylene black, and carbon fibers are particularly preferred. An additive amount of the negative conductive additive is preferably set to 5% by mass or less with respect to a mass of the negative active material. Incidentally, when graphites such as the natural graphites and synthetic graphites are used as the conductive additive, a ratio of a mass of the non-graphitizable carbon to a total amount of a mass of the non-graphitizable carbon and a mass of the graphite is calculated including the graphite as the conductive additive. That is, in this case, the mass of the graphite is a sum of a mass of graphite as the negative active material and a mass of graphite as the conductive additive.

A type of a negative binder is not particularly limited as long as it is stable to a solvent or an electrolyte solution used in manufacturing an electrode and stable to an oxidation-reduction reaction during charging/discharging. For example, when an aqueous solvent is used for a composition of the negative composite, as a negative binder, water-soluble or water-dispersible polymers, for example, cellulose-based polymers such as carboxymethyl cellulose (CMC) and hydroxypropyl methylcellulose (HPMC); polyvinyl alcohol (PVA); fluorine-based resins such as polytetrafluoroethylene (PTFE) and a tetrafluoroethylene-hexafluoropropylene copolymer (FEP); a vinylacetate copolymer; and rubbers such as a styrene-butadiene rubber (SBR) and an acrylic acid-modified SBR resin (SBR-based latex) can be preferably employed. Further, when a non-aqueous solvent is used for the composition of the negative composite, as a negative binder, polymers such as polyvinylidene fluoride (PVDF) polyvinylidene chloride (PVDC) can be preferably employed. These negative binders may be used singly or may be used as a mixture of two or more thereof. Incidentally, the polymer material exemplified in the above can be used for the purpose of achieving a function as the thickener and other additives of the above-mentioned composition in addition to a function as the binder.

As the negative binder, a so-called nonaqueous binder may be used, or a so-called aqueous binder may be used. In the case of considering environmental issues, the aqueous binder can be suitably used. The aqueous binder includes water-dispersible binders which are not dissolved in water but are dispersed in water well, and water-soluble binders which are dissolved in water. As the water-dispersible binder and the water-soluble binder, specifically, the above-mentioned water-soluble and water-dispersible polymers are exemplified.

Further, the negative composite may contain a negative electrode thickener. As the negative electrode thickener, as required, a optional compound of polysaccharides such as methyl cellulose (MC) or carboxymethyl cellulose (CMC), sodium salts or ammonium salts of these polysaccharides, and N-methylpyrrolidone (NMP), can be appropriately selected.

One or both surfaces of the negative electrode foil is coated with a negative paste by a publicly known technique such as a reverse roll method, a direct roll method, a blade method, a knife method, and dipping method.

Thereafter, the negative electrode plate is pressed to a predetermined thickness, and then dried in a drying step.

As a separator, a polyolefin microporous membrane, a cloth or nonwoven fabric made of a synthetic resin, a cloth or nonwoven fabric of natural fibers, glass fibers or ceramic fibers, paper or the like can be used. As the polyolefin microporous membrane, polyethylene, polypropylene, or a combined membrane thereof can be used. The synthetic resin fiber can be selected from polyacrylonitrile (PAN), polyamide (PA), polyester, polyethylene terephthalate (PET), polyolefins such as polypropylene (PP) or polyethylene (PE), or a mixture thereof. Among these, a fabric cloth, a nonwoven fabric or a synthetic resin microporous membrane made of a polyolefin resin such as polyethylene or polypropylene which is insoluble in organic solvents can be preferably used as the separator. The separator may be configured by laminating a plurality of microporous membranes which are different in the type of the material, the weight average molecular weight and porosity, and by including an adequate amount of an additive such as various plasticizers, antioxidants or flame retarders in these microporous membranes. Further, the separator may be one provided with an inorganic oxide, such as silica or alumina, applied onto one or both surfaces of the microporous membrane. With respect to the separator, it is particularly preferred from the viewpoint of a thickness, membrane strength or membrane resistance to use polyolefin-based microporous membranes such as a microporous membrane made of polyethylene and polypropylene, a microporous membrane made of polyethylene and polypropylene which is combined with aramid or polyimide, or a microporous membrane formed by combining these membranes. A thickness of the separator is preferably 5 to 35 µm.

As an electrolyte solution, a nonaqueous electrolyte solution formed by dissolving an electrolytic salt in a nonaqueous solvent can be used. The separator is impregnated with the electrolyte solution in the case 11. The electrolyte solution is not limited, and materials which are commonly proposed to be used for lithium ion batteries or the like can be used for the electrolyte solution. Examples of the nonaqueous solvent include, but are not limited to, one compound or a mixture of two or more of compounds of cyclic carbonic acid esters such as propylene carbonate, ethylene carbonate, butylene carbonate, chloroethylene carbonate and vinylene carbonate; cyclic esters such as γ-butyrolactone and γ-valerolactone; chain carbonates such as dimethyl carbonate, diethyl carbonate and ethylmethyl carbonate; chain esters such as methyl formate, methyl acetate and methyl butyrate; tetrahydrofuran and derivatives thereof, ethers such as 1,3-dioxane, 1,4-dioxane, 1,2-dimethoxyethane, 1,4-dibutoxyethane and methyl diglyme; nitriles such as acetonitrile and benzonitrile; dioxolane and derivatives thereof; and ethylene sulfide, sulfolane, sultone and derivatives thereof. Incidentally, a publicly known additive may be added to the electrolyte solution.

Examples of electrolytic salts include inorganic ionic salts containing one of lithium (Li), sodium (Na), or potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$ and KSCN; and organic ionic salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate lithium stearylsulfonate, lithium octylsulfonate, and lithium dodecylbenzenesulfonate, and these ionic compounds may be used singly or in combination of two or more of them.

As the electrolyte solution, a room temperature molten salt or an ionic liquid may be used.

A plurality of the energy storage devices 10 may be combined to form an energy storage apparatus (module).

FIG. 10 is a perspective view of an appearance of an energy storage apparatus 1.

As shown in FIG. 10, the energy storage apparatus 50 includes a plurality of the energy storage devices 10 and at least one bus bar 52 that electrically connects two of the energy storage devices 10. The energy storage apparatus 50 may include a plurality of bus bars 52. Each of bus bars 52 electrically connects the positive (or negative) electrode in one of the energy storage devices 10 to the negative (or positive) electrode in its adjacent energy storage device 10 in the energy storage devices 10. As a result, these energy storage devices 10 are connected in series.

The energy storage apparatus 50 may include an exterior casing that accommodates the energy storage devices 10 and a control board for monitoring the charge and discharge states of the energy storage devices 10.

The energy storage apparatus 50 can attain the same effects as those of the energy storage device 10, i. e., can attain an increased cycle performance and input performance.

Hereinafter, the present invention will be described in detail based on Examples. Incidentally, the present invention is not limited to the following Examples.

EXAMPLES AND COMPARATIVE EXAMPLES

With respect to Examples and Comparative Examples, an energy storage device 10 was prepared as follows. A positive electrode plate, a negative electrode plate and a separator were superimposed, the thus formed stack was wound. A region of the positive electrode plate on which the positive composite layer was not formed and a region of the negative electrode plate on which the negative composite layer was not formed were welded to a positive current collector and a negative current collector, respectively, by a publicly known method. The wound stack was housed in a case main body 14. A lid 15 was welded to the case main body 14, a nonaqueous electrolyte was injected into the case 14 and the case 14 was sealed.

The positive electrode plate was prepared as follows, $LiNi_{1/3}Co_{1/3}Mn_{1/3}O_2$ was used as a positive active material, acetylene black was used as a conductive additive, and PVDF was used as a binder. The positive paste was prepared by mixing and kneading N-methyl-2-pyrrolidone (NMP) as a solvent, the conductive additive so as to be 4.5% by mass, the binder so as to be 4.5% by mass, and the positive active material so as to be 91% by mass. Further, the prepared positive paste was applied, in an amount of 6.9 mg/cm², onto an aluminum foil having a thickness of 15 μm so that an applied portion of the paste was 83 mm wide and a portion not having the paste applied thereon (region on which the positive active material was not formed) was 11 mm wide. The aluminum foil on which the positive paste was applied was dried, compression-formed with a roll press, and vacuum-dried to remove a water content.

The negative electrode plate was prepared as follows. As the negative active material, an active material prepared by mixing graphite and non-graphitizable carbon in a predetermined mixing ratio was used. In FIG. 3 to FIG. 7, a D50 particle size of the graphite (hereinafter, also referred to as DG), a D50 particle size of the non-graphitizable carbon (hereinafter, also referred to as DN), and mixing ratios of the graphite and the non-graphitizable carbon are compiled. Incidentally, the mixing ratio means "a ratio of non-graphitizable carbon or graphite to a total amount of the non-graphitizable carbon and the graphite".

Further, a styrene-butadiene rubber (hereinafter, abbreviated to SBR) and carboxymethyl cellulose (hereinafter, abbreviated to CMC) of an ammonium salt were used as an aqueous binder, and the negative paste was prepared by mixing and kneading the SBR so as to be 2% by mass, the CMC so as to be 1% by mass, and the negative active material (total of graphite and non-graphitizable carbon) so as to be 97% by mass. Further, the prepared negative paste was applied, in an amount of 3.0 mg/cm², onto a copper foil having a thickness of 8 μm so that an applied portion of the paste was 87 mm wide and a portion not having the paste applied thereon (region on which the negative active material was not formed) was 9 mm wide. the copper foil on which the negative paste was applied was dried, compression-formed with a roll press, and vacuum-dried to remove a water content.

As the separator, a polyethylene microporous membrane having a thickness of 21 μm in which air permeability was about 100 sec/100 cm³ was used.

The positive electrode plate, the separator, the negative electrode plate and the separator thus obtained are overlaid in turn and wound in the form a vortex to prepare a wound-type electrode group 20.

A nonaqueous electrolyte was prepared by using a solvent which is formed by mixing ethylene carbonate, dimethyl carbonate and ethyl methyl carbonate so as to be respectively 30% by volume, 40% by volume and 30% by volume, dissolving $LiPF_6$ in this solvent so that a salt concentration was 1.2 mol/L, and further adding vinylene carbonate so as to be 0.3% by mass.

<Measurement>

The following measurement tests were performed on Examples and Comparative Examples, various value are calculated, and results thereof are summarized in FIG. 8 to FIG. 12.

(Capacity Evaluation Test)

Constant current constant voltage charge of the prepared battery was performed for 3 hours at a charge current of 5 A and at a voltage of 4.2 V in a constant-temperature oven at 25° C., and after a quiescent time of 10 minutes, constant current discharge of the battery was performed to 2.4 V at a discharge current of 5 A, and thereby a discharge capacity Q of the battery was measured.

(Input Evaluation Test)

The battery whose capacity had been measured was charged by 20% of the discharge capacity measured in the above-mentioned Capacity Evaluation Test to adjust an SOC (state of charge) of the battery to 20%, and then the battery was held at −10° C. for 4 hours, and thereafter the constant voltage discharge of 4.2 V was performed for 1 second, and a low temperature input P was calculated from a current value 1 second later.

(Charge-Discharge Cycle Test)

In order to determine test conditions of the charge-discharge cycle test, measurement of a voltage V80 in the 80% SOC and a voltage V20 in the 20% SOC was performed by the following method. A battery whose SOC was adjusted to 50% by charging an electricity corresponding to 50% of a discharge capacity Q of the battery was held at 55° C. for 4 hours. Thereafter, SOC of the battery was adjusted to 80% by charging an electricity of 30% of a discharge capacity Q at a constant current of 40 A at 55° C., and a voltage V80 in the 80% SOC was measured. Thereafter, the SOC of the battery was adjusted to 20% by discharging an electric capacity corresponding to 60% of a discharge capacity Q at a constant current discharge of 40 A from an 80% SOC to a 20% SOC, and a voltage V20 in the 20% SOC was measured.

The cycle test at 55° C. was performed at a constant current of 40 A, and continuously performed without setting a quiescent time, setting a cut-off voltage at the time of charging to V80 and setting a cut-off voltage at the time of discharging to V20. A cycle time was set to 3000 hours in total. After completion of the 3000-hour cycle test, the battery was held at 25° C. for 4 hours, and the above-mentioned capacity evaluation test and low temperature input evaluation test were performed. A capacity reduction rate after the cycle test was calculated from the formula of capacity reduction rate $\delta Q = 100 - Q2/Q1 \times 100$ in denoting a capacity before the cycle test (initial capacity) by Q1 and a capacity after the cycle test (capacity after cycle) by Q2. Similarly, an input decrease ratio was calculated from the formula of input decrease ratio $\delta P = 100 - P2/P1 \times 100$ in denoting an input before the cycle test (initial input) by P1 and an input after the cycle test (input after cycle) by P2.

In FIG. 8 to FIG. 12, "Capacity Reduction Rate" means a capacity reduction rate δQ and "Input Reduction Rate" means an input reduction rate δP. "Initial Capacity" in FIG. 8 to FIG. 12 means a capacity Q1 before a cycle test, and "Initial Input" in FIG. 8 to FIG. 12 means an input P1 before a cycle test. "Capacity After Cycle" in FIG. 8 to FIG. 12 means a capacity Q2 after a cycle test, and "Input After Cycle" in FIG. 8 to FIG. 12 means an input P2 after a cycle test.

(Measurement of D50 Particle Size)

The D50 particle sizes of the graphite and the non-graphitizable carbon were measured. In the present specification, the D50 particle size refers to a particle size at which a cumulative degree is 50% in a particle size distribution on a volume basis. Specifically, a particle size distribution measurement apparatus (SALD-2200, manufactured by SHIMADZU CORPORATION) of laser diffraction type was used as a measurement apparatus, and Wing SALD-2200 was used as a measurement control software.

(Capacity after Cycle (Comparative Example Ratio) and Input after Cycle (Comparative Example Ratio))

When each experiment example is equal in D50 particle size to one of the experiment examples (Comparative Examples 1 to 6) in which ratios of non-graphitizable carbon are 100%, by taking the one of the experiment examples as 100%, a ratio of a capacity after cycle Q3 and a ratio of an input after cycle P3 of each experiment example were calculated. "Capacity after Cycle (Comparative Example Ratio)" in FIG. 8 to FIG. 12 means the ratio of the capacity after cycle Q3 calculated when each experiment example is equal in D50 particle size to one of the experiment examples (Comparative Examples 1 to 6) in which ratios of non-graphitizable carbon are 100% and the one of the experiment examples is taken as 100%. "Input after Cycle (Comparative Example Ratio)" in FIG. 8 to FIG. 12 means the ratio of the input after cycle P3 calculated when each experiment example is equal in D50 particle size to one of the experiment examples (Comparative Examples 1 to 6) in which ratios of non-graphitizable carbon are 100% and the one of the experiment examples is taken as 100%.

Specifically, in the case of Example 1 using graphite whose D50 particle size is 2.1 μm, "Capacity after Cycle (Comparative Example Ratio)" and "Input after Cycle (Comparative Example Ratio)" of Example 1 were calculated taking, as 100%, the capacity after cycle and the input after cycle of Comparative Example 2 using graphite equal in D50 particle size to Example 1. Similarly, in the case of Examples and Comparative Examples using graphite whose D50 particle size is 4.5 μm, "Capacity after Cycle (Comparative Example Ratio)" and "Input after Cycle (Comparative Example Ratio)" were calculated taking, as 100%, the capacity after cycle and the input after cycle of Comparative Example 3 using graphite whose D50 particle size is 4.5 μm.

Incidentally, Comparative Examples in which D50 particle size of graphite is 10.1 μm (Comparative Examples 27, 37, 48, 59) were calculated taking Comparative Example 6 in which D50 particle size of graphite is 10.1 μm as 100%.

Further, in experiment examples in which the graphite is not added and a ratio of the non-graphitizable carbon is 100% by mass (Comparative Examples 62 to 67), a capacity after cycle Q3 and an input after cycle P3 of each experiment example were calculated taking, as 100%, experiment examples (Comparative Examples 1 to 6) using graphites whose D50 particle sizes are equal to D50 particle sizes of non-graphitizable carbons of Comparative Examples 62 to 67. Specifically, for example, in the case of Comparative Example 62, taking the capacity after cycle and the input after cycle of Comparative Example 1 as 100%, "Capacity after Cycle (Comparative Example Ratio)" and "Input after Cycle (Comparative Example Ratio)" of Comparative Example 62 were calculated. Similarly, in the case of Comparative Example 63, taking values of Comparative Example 2 as 100%, "Capacity after Cycle (Comparative Example Ratio)" and "Input after Cycle (Comparative Example Ratio)" were calculated.

Incidentally, in this case, regarding DN (6.2 μm) of Comparative Example 65 and DC (6.3 μm) of Comparative Example 4 as an equal D50 particle size, "Capacity after Cycle (Comparative Example Ratio)" and "Input after Cycle (Comparative Example Ratio)" of Comparative Example 65 were calculated. Similarly, regarding DN (8.1 μm) of Comparative Example 66 and DG (8.3 μm) of Comparative Example 5 as an equal D50 particle size, and regarding DN (10.4 μm) of Comparative Example 67 and DG (10.1 μm) of Comparative Example 6 as an equal D50 particle size, "Capacity after Cycle (Comparative Example Ratio)" and "Input after Cycle (Comparative Example Ratio)" of Comparative Example 66 and Comparative Example 67 were calculated.

<Results>
(Capacity after Cycle (Comparative Example Ratio))

Figure 13:
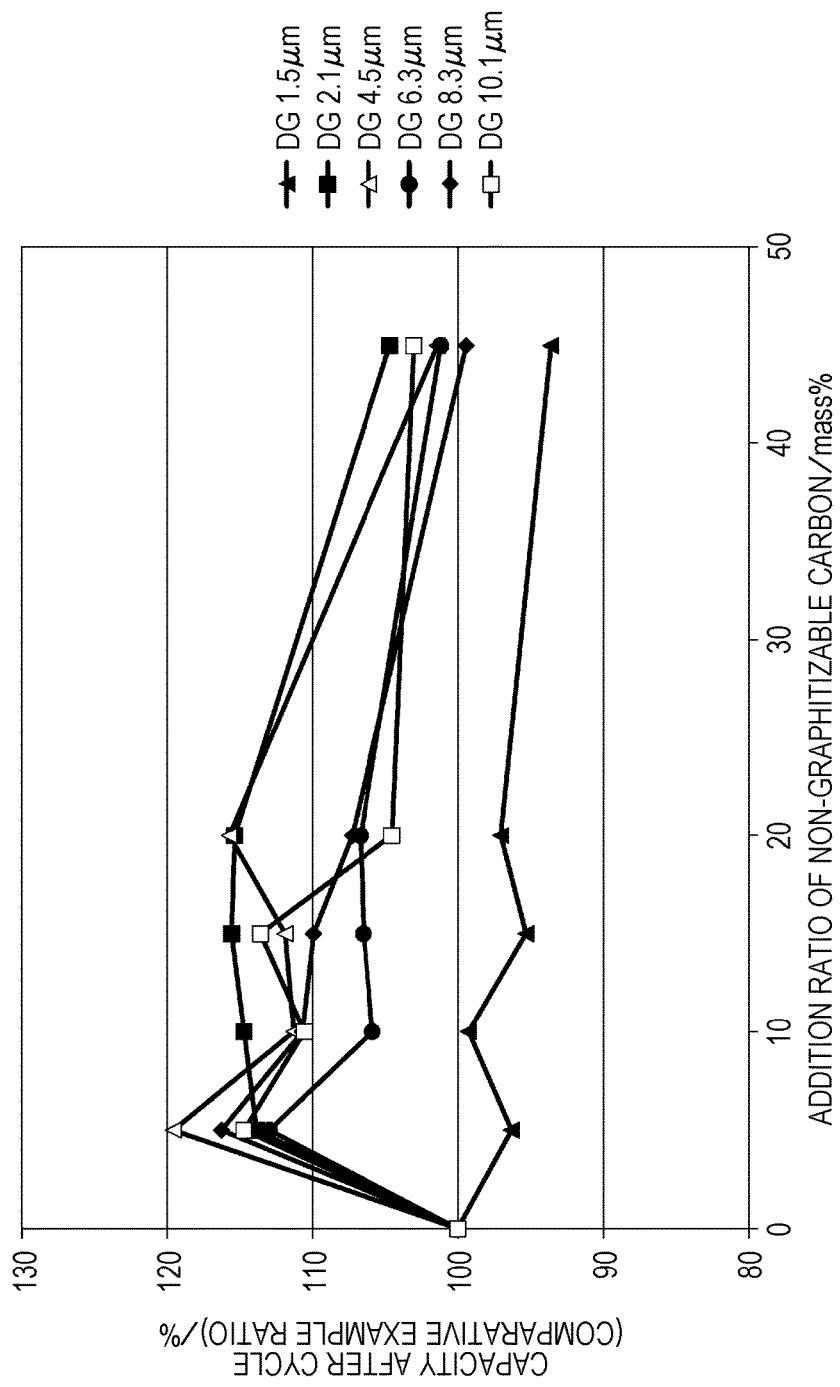
FIG. 13 is a view showing changes in a capacity after cycle (comparative example ratio) with respect to an addition ratio of non-graphitizable carbon.

The results shown in FIG. 13 will be described below, Correspondence between a series of data shown in FIG. 13 and Example or Comparative Example is described below.
  DG1.5 μm: Comparative Examples 1, 8, 19, 30, 40, 51
  DG2.1 μm: Comparative Example 2, Examples 1, 16, 31, 46, 61
  DG4.5 μm: Comparative Example 3, Examples 3, 18, 33, 48, 63
  DG6.3 μm: Comparative Example 4, Examples 6, 21, 36, 51, 66
  DG8.3 μm: Comparative Example 5, Examples 10, 25, 40, 55, 70
  DG10.1 μm: Comparative Example 6, Examples 15, 30, 45, 60, 75

When a ratio DG/DN was kept nearly constant (0.97 to 1.02), and a ratio between the non-graphitizable carbon and the graphite was varied, in the energy storage device in which the DG was 1.5 μm, the capacity after cycle was decreased as an addition amount of the non-graphitizable carbon was increased. On the other hand, in the energy storage devices in which the DG were 2.1 μm or more and 0.1 μm or less, the capacities after cycle of energy storage devices in which a ratio of the non-graphitizable carbon was 5% by mass or more and 45% by mass or less are equal to or higher than the capacity after cycle of the energy storage device in which a ratio of the non-graphitizable carbon was 0% by mass.

That is, it was found in regard to graphites whose D50 particle size is 2.1 μm to 10.1 μm that by setting the ratio of a mass of the non-graphitizable carbon to a total amount of a mass of the graphite and a mass of non-graphitizable carbon to 5% by mass or more and 45% by mass or less, the effect that the capacity after cycle is equal to or higher than that of Comparative Examples 1 to 7 having equal D50 particle size in which a ratio of the graphite is 100% by mass, is achieved.

Further, in reference to FIG. 8 to FIG. 12, it was found that by setting the ratio of a mass of the non-graphitizable carbon to a total amount of a mass of the graphite and a mass of non-graphitizable carbon to 5% by mass or more and 45% by mass or less, the effect of improving the input after cycle while keeping the capacity after cycle equal to or higher than that of Comparative Examples 1 to 7 having equal D50 particle size in which a ratio of the graphite is 100% by mass, is achieved. The reason for this is supposed that by setting the ratio of the non-graphitizable carbon to 5% by mass or more and 45% by mass or less, a reduction of cycle performance was suppressed.

When comparing Examples 1 to 75 with Comparative Examples 1 to 67, it was found that in Examples 1 to 75 which satisfy the following requirements, the effect of improving the input after cycle while keeping the capacity after cycle equal or higher is achieved.
  D50 particle size of graphite is 2 μm or more
  A ratio of a mass of the non-graphitizable carbon to a total amount of a mass of the graphite and a mass of non-graphitizable carbon is 5% by mass or more and 45% by mass or less.
  A ratio of the D50 particle size of the graphite to the D50 particle size of the non-graphitizable carbon is 1.02 or less.

Moreover, it was found that by setting the ratio of a mass of non-graphitizable carbon to a total amount of a mass of graphite and a mass of non-graphitizable carbon to 5% by mass or more and 20% by mass or less, particularly, the effect of improving the capacity after cycle becomes remarkable.

Further, it was found that by setting the ratio of a mass of non-graphitizable carbon to a total amount of a mass of graphite and a mass of non-graphitizable carbon to 15% by mass or more and 20% by mass or less, particularly, the effect of improving the input after cycle while maintaining the capacity after cycle nearly equal to Examples in which the above ratio is 5% by mass or more and 10% by mass or less, becomes remarkable.

(Input after Cycle)

Figure 14:
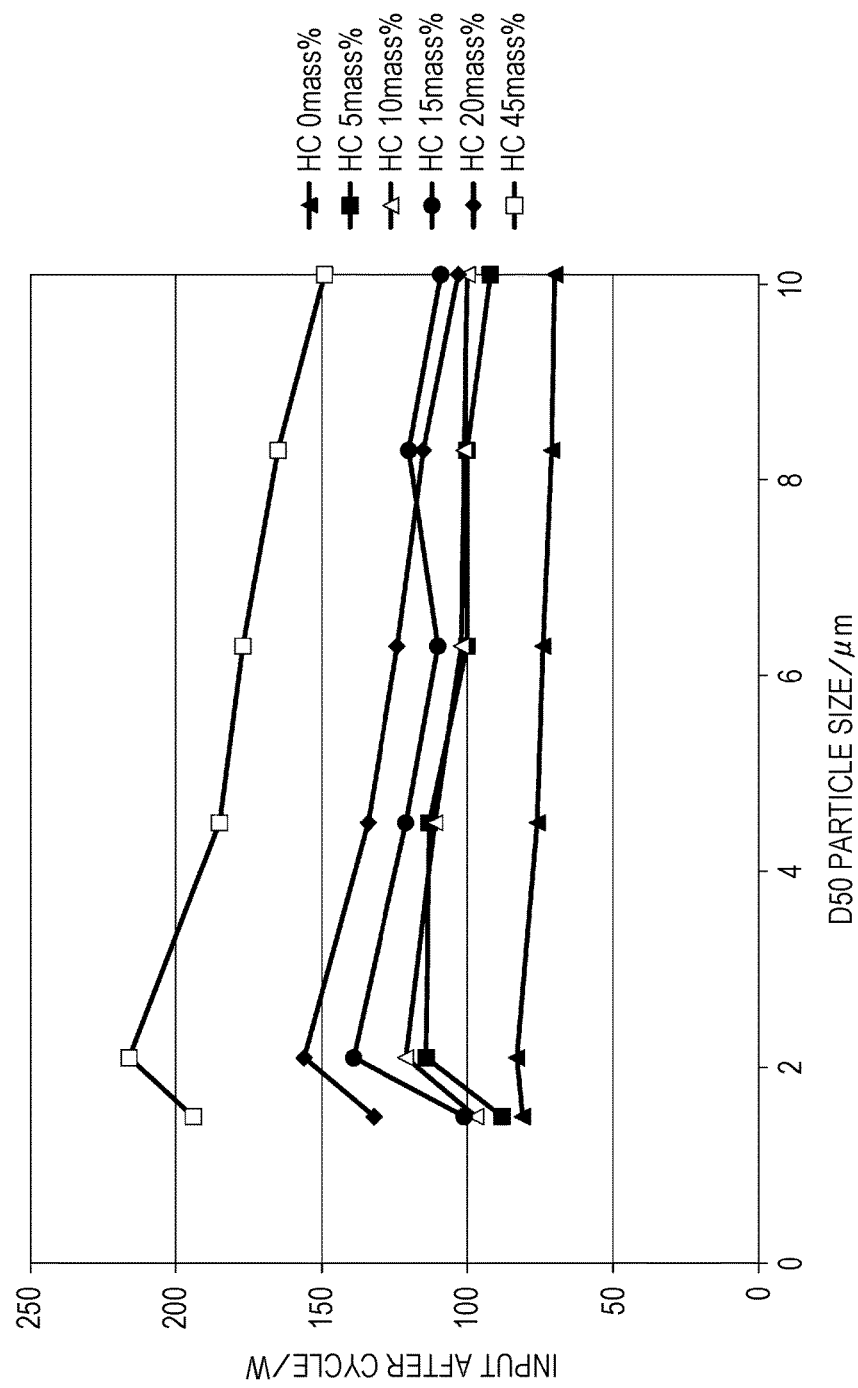
FIG. 14 is a view showing changes in an input after cycle with respect to a D50 particle size of graphite.
Figure 16:
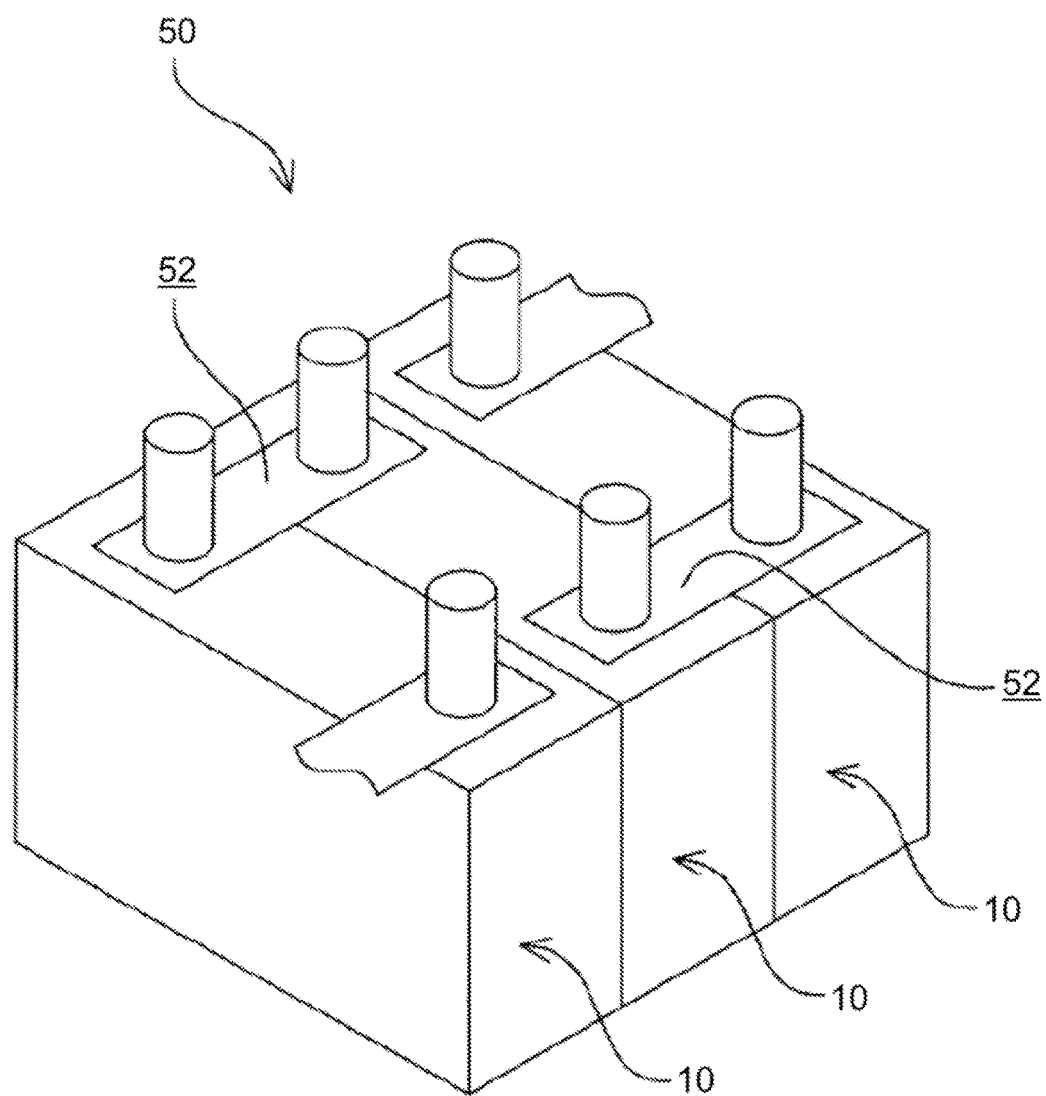
FIG. 16 is a perspective view showing an energy storage apparatus.

Next, the results shown in FIG. 14 and FIG. 15 will be described below. Correspondence between a series of data shown in FIG. 14 and FIG. 15 and Example or Comparative Example is described below.

HC0 mass %: Comparative Examples 1, 2, 3, 4, 5, 6, 7
HC5 mass %: Comparative Example 8, Examples 1, 3, 6, 10, 15
HC10 mass %: Comparative Example 19, Examples 16, 18, 21, 25, 30
HC15 mass %: Comparative Example 30, Examples 31, 33, 36, 40, 45
HC20 mass %: Comparative Example 40, Examples 46, 48, 51, 55, 60
HC45 mass %: Comparative Example 51, Examples 61, 63, 66, 70, 75

When a ratio DG/DN was kept nearly constant (0.97 to 1.02), and a D50 particle size of the graphite was varied, in Comparative Examples 1 to 7 in which the ratio of a mass of non-graphitizable carbon to a total amount of a mass of graphite and a mass of non-graphitizable carbon is 0% by mass, the input after cycle has a tendency to decrease as a particle size of the graphite was increased.

On the other hand, it was found that the absolute value of the input after cycle is improved in regard to the energy storage devices in which the ratio of a mass of non-graphitizable carbon to a total amount of a mass of graphite and a mass of non-graphitizable carbon is 5% by mass or more and 45% by mass or less, and the particle size of the graphite is 2 μm or more and 6.3 μm or less. The reason for this is supposed that in the graphite, cut off of a conductive path associated with repeated cycles of charge-discharge was suppressed.

The results shown in FIG. 15 indicate that when the particle size of the graphite is 2.0 μm or more, and the particle size of the graphite is 4.5 μm or less, all of the absolute value of the capacity after cycle, the absolute value of the input after cycle, the capacity after cycle compared with Comparative Example and the input after cycle compared with Comparative Example are significantly improved. It is an unexpected effect that from a value of the particle size of graphite of 2.0 μm, all of the absolute value of the capacity after cycle, the absolute value of the input after cycle, the capacity after cycle compared with Comparative Example and the input after cycle compared with Comparative Example are improved.

Further, when comparing Example 3 with Examples 6, 10, and 15, from a value of the particle size of graphite of 4.5 μm, the absolute value of the input after cycle is drastically improved. Further, when also comparing Example 18 with Examples 21, 25, and 30, from a value of the particle size of graphite of 4.5 μm, the absolute value of the input after cycle is considerably improved. It is an unexpected effect that from a value of the particle size of graphite of 4.5 μm, the absolute value of the input after cycle is improved.

Further, in reference to FIG. 8 to FIG. 12, it was found that the capacity after cycle (comparative example ratio) and the input after cycle (comparative example ratio) are both improved in regard to the energy storage devices in which the D50 particle size of the graphite and the D50 particle size of the non-graphitizable carbon are both 2 μm or more and 4.5 μm or less, and the ratio of a mass of the non-graphitizable carbon to a total amount of a mass of the graphite and a mass of non-graphitizable carbon is 5% by mass or more and 20% by mass or less. The reason for this is supposed that by setting the D50 particle size of the non-graphitizable carbon to 2 μm or more and 4.5 μm or less, a capacity and input performance after repeating charge-discharge were improved. Further, the reason for this is supposed that by setting the ratio of the non-graphitizable carbon having excellent cycle performance to 5% by mass or more and 20% by mass or less, the cycle performance was improved.

<Other Embodiments>

The technology described in the present specification is not limited to Embodiments described by the above descriptions and drawings, and for example, following Embodiments are embraced by the scope of technology described in the present specification.

(1) The energy storage device of the present embodiment was a prismatic battery, but the energy storage device is not limited to this, and may be a cylindrical type or a laminate type, and an optional shape can be appropriately selected as required. Further, the electrode group of the present embodiment was a wound type, but the electrode group is not limited to this, and may be a stacked type. Specifically, the energy storage device may include a plurality of positive electrodes and a plurality of negative electrodes, and the plurality of positive electrodes and the plurality of negative electrodes may be laminated with a separator arranged between the electrodes.

(2) The energy storage device of the present embodiment was a lithium ion battery, but the energy storage device is not limited to this, and may be a capacitor.

What is claimed is:
1. An energy storage device comprising:
a positive electrode; and
a negative electrode,
wherein the negative electrode comprises graphite and non-graphitizable carbon,
a D50 particle size of the graphite at which a cumulative volume in a particle size distribution of a particle size reaches 50% is 2 μm or more and 4.5 μm or less,
a D50 particle size of the non-graphitizable carbon is 2 μm or more and 4.5 μm or less,
a ratio of a mass of the non-graphitizable carbon to a total amount of a mass of the graphite and a mass of the non-graphitizable carbon is 15% by mass or more and 45% by mass or less,
a ratio of the D50 particle size of the graphite to a D50 particle size of the non-graphitizable carbon is 1.02 or less, and
the graphite and the non-graphitizable carbon are separate particles from each other.
2. The energy storage device according to claim 1 wherein a ratio of a mass of the non-graphitizable carbon to a total amount of a mass of the graphite and a mass of the non-graphitizable carbon is 15% by mass or more and 20% by mass or less.
3. The energy storage device according to claim 1, wherein the negative electrode further comprises an aqueous binder.

4. The energy storage device according to claim 1,
wherein the negative electrode comprises at least one of methyl cellulose, carboxymethyl cellulose, a sodium salt or an ammonium salt of methyl cellulose, and a sodium salt or an ammonium salt of carboxymethyl cellulose.

5. The energy storage device according to claim 1, further comprising:
a separator,
wherein the positive electrode includes a plurality of positive electrodes,
the negative electrode includes a plurality of negative electrodes, and
the plurality of positive electrodes and the plurality of negative electrodes are superimposed with the separator arranged therebetween.

6. An energy storage apparatus comprising a plurality of the energy storage devices according to claim 1.

\* \* \* \* \*